(12) United States Patent
Garofalakis et al.

(10) Patent No.: US 7,693,335 B2
(45) Date of Patent: Apr. 6, 2010

(54) DETERMINISTIC WAVELET THRESHOLDING FOR GENERAL-ERROR METRICS

(75) Inventors: Minos N. Garofalakis, Morristown, NJ (US); Amit Kumar, New Delhi (IN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 678 days.

(21) Appl. No.: 11/152,842

(22) Filed: Jun. 13, 2005

(65) Prior Publication Data

US 2006/0280378 A1    Dec. 14, 2006

(51) Int. Cl.
G06K 9/46    (2006.01)
(52) U.S. Cl. ........................ 382/191; 235/454
(58) Field of Classification Search .......... 382/191, 382/100, 190, 207, 226, 227, 228; 235/454
See application file for complete search history.

(56) References Cited

U.S. PATENT DOCUMENTS 5,710,835 A    1/1998    Bradley

OTHER PUBLICATIONS

Garafalakis, Wavelet Synopses with Error Guarantees, Jun. 4, 2002, ACM Sigmod, p. 229-240.*
Garafalakis, Probabilistic Wavelet Synopses, Mar. 2004, ACM transactions on Database Sys, vol. 29 No. 1, pp. 43-90.*
J. M. Hellerstein, et al., "Online Aggregation", SIGMOD '97, Arizona, pp. 171-182.
A. Natsev et al., "WALRUS: A Similarity Retrieval Algorithm for Image Databases", SIGMOD '99 Philadelphia, PA, pp. 395-406.
K. Chakrabarti et al., "Approximate Query Processing Using Wavelets", Proceedings of the 26th VLDB Conference, Cairo, Egypt, 2000, pp. 111-122.
Y. Matias, "Dynamic Maintenance of Wavelet-Based Histograms", Proceedings of the 26$^{th}$ VLDB Conference, Cairo, Egypt, 2000.
A. Gilbert et al., "Surfing Wavelets on Streams: One-Pass Summaries for Approximate Aggregate Queries", Proceedings of the 27$^{th}$ VLDB Conference, Roma, Italy, 2001.
A. Deshpande et al., "Independence is Good: Dependency-Based Histogram Synopses for High-Dimensional Data", ACM SIGMOD May 21-24, 2001. Santa Barbara. CA.
M. Garafalakis and P. B. Gibbons, "Wavelet Synopses With Error Guarantees", ACM SIGMOD 'Jun. 4-6, 2002, Madison, Wisconsin.
A. Deligiannakis and N. Roussopoulos, "Extended Wavelets for Multiple Measures", SIGMOD 2003, Jun. 9-12, San Diego, CA, pp. 229-240.
M. Garafalakis and P. B. Gibbons, "Probabilistic Wavelet Synopses", ACM Transactions on Database Systems, vol. 29, No. 1, Mar. 2004, pp. 43-90.
S. Guha, "A Note on Wavelet Optimization".
J. S. Vitter and M. Wang, "Approximate Computation of Multidimensional Aggregates of Sparse Data Using Wavelets".

(Continued)

Primary Examiner—Anand Bhatnagar
(74) Attorney, Agent, or Firm—Wall & Tong, LLP

(57) ABSTRACT

Novel, computationally efficient schemes for deterministic wavelet thresholding with the objective of optimizing maximum-error metrics are provided. An optimal low polynomial-time algorithm for one-dimensional wavelet thresholding based on a new dynamic-programming (DP) formulation is provided that can be employed to minimize the maximum relative or absolute error in the data reconstruction. Directly extending a one-dimensional DP algorithm to multi-dimensional wavelets results in a super-exponential increase in time complexity with the data dimensionality. Thus, novel, polynomial-time approximation schemes (with tunable approximation guarantees for the target maximum-error metric) for deterministic wavelet thresholding in multiple dimensions are also provided.

6 Claims, 14 Drawing Sheets

OTHER PUBLICATIONS

S. Muthukrishnan et al., "On Rectangular Partitionings in Two Dimensions: Algorithms, Complexity, and Applications".

Y. Matias et al., "Wavelet-Based Histograms for Selectivity Estimation".

B. Jawerth and W. Sweldens, "An Overview of Wavelet Based Multiresolution Analyses".

D. Gunopulos et al., "Approximating Multi-Dimensional Aggregate Range Queries Over Real Attributes".

* cited by examiner

DETERMINISTIC WAVELET THRESHOLDING FOR GENERAL-ERROR METRICS

FIELD OF THE INVENTION

The present invention relates generally to the field of wavelet synopses and, in particular, relates to computationally-efficient schemes for deterministic maximum-error wavelet thresholding in one and multiple dimensions.

BACKGROUND OF THE INVENTION

Several studies have demonstrated the effectiveness of the wavelet decomposition as a tool for reducing large amounts of data down to compact wavelet synopses that can be used to obtain fast, accurate approximate answers to user queries. While conventional wavelet synopses are based on greedily minimizing the overall root-mean-squared (i.e., $L_2$-norm) error in the data approximation, recent work has demonstrated that such synopses can suffer from important problems, including severe bias and wide variance in the quality of the data reconstruction, and lack of non-trivial guarantees for individual approximate answers. As a result, probabilistic thresholding schemes have been recently proposed as a means of building wavelet synopses that try to probabilistically control other approximation-error metric, such as the maximum relative error in data-value reconstruction, which is arguably the most important for approximate query answers and meaning full error guarantees.

One of the main open problems posed by this earlier work is whether it is possible to design efficient deterministic wavelet-thresholding algorithms for minimizing general, non-$L_2$ error metrics that are relevant to approximate query processing systems, such as maximum relative or maximum absolute error. Such algorithms can guarantee better wavelet synopses and avoid the pitfalls of probabilistic techniques (e.g., bad coin-flip sequences) leading to poor solutions.

SUMMARY

Various deficiencies of the prior art are addressed by embodiments of the present invention including novel, computationally efficient schemes for deterministic wavelet thresholding with the objective of optimizing general approximation-error metrics. Embodiments include an optimal low polynomial-time algorithm for one-dimensional wavelet thresholding based on a dynamic-programming (DP) formulation that can be employed to minimize the maximum relative or absolute error in the data reconstruction. Directly extending the one-dimensional DP algorithm to multi-dimensional wavelets results in a super-exponential increase in time complexity with the data dimensionality. Thus, embodiments also include novel, polynomial-time approximation schemes (with tunable approximation guarantees for the target maximum-error metric) for deterministic wavelet thresholding in multiple dimensions. These embodiments for optimal and approximate thresholding algorithms for maximum error are extended to handle a broad, natural class of distributive error metrics, which includes several error measures, such as mean weighted relative error and weighted $L_P$-norm error. Experimental results on real-world and synthetic data sets demonstrate the effectiveness of the embodiments for these extensions.

One embodiment is a method for deterministic wavelet thresholding for optimizing maximum-error metrics. A deterministic wavelet synopsis is built that minimizes maximum error in a data-value approximation. A minimum maximum error for all data values in a subtree for the deterministic wavelet synopsis is provided.

Another embodiment is another method for deterministic wavelet thresholding for optimizing maximum-error metrics. A minimum error value for an error subtree is conditioned not only on a root node of the error subtree and the amount of synopsis storage allotted, but also on an error that enters the subtree through coefficient selections made on a path from the root node to a particular node, excluding that particular node itself. All possible coefficient selections are tabulated in polynomial time.

Yet another embodiment is another method for deterministic wavelet thresholding for optimizing maximum error metrics. A range of all possible error contributions for paths up to a root node of an error subtree are approximately covered using a plurality of approximate error values. The approximate error values are tabulated by capturing approximate error in a plurality of error subtrees. Each error subtree is rooted at a particular node. The rounded additive error contribution due to ancestors of the particular node being discarded from a synopsis is tabulated.

Still another embodiment is another method for deterministic wavelet thresholding for optimizing maximum error metrics. Each coefficient is replaced with a scaled-down coefficient value in an error tree for multi-dimensional wavelet thresholding. Dynamic programming is performed over the error tree. A table is built for each node in the error tree. The table holds a minimum maximum absolute error in a subtree for that node and an error contribution due to ancestors of that node. All coefficients in a set of coefficients in a synopsis that are greater than a predefined constant are retained. An error approximation is calculated and provided.

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

Figure 1A:
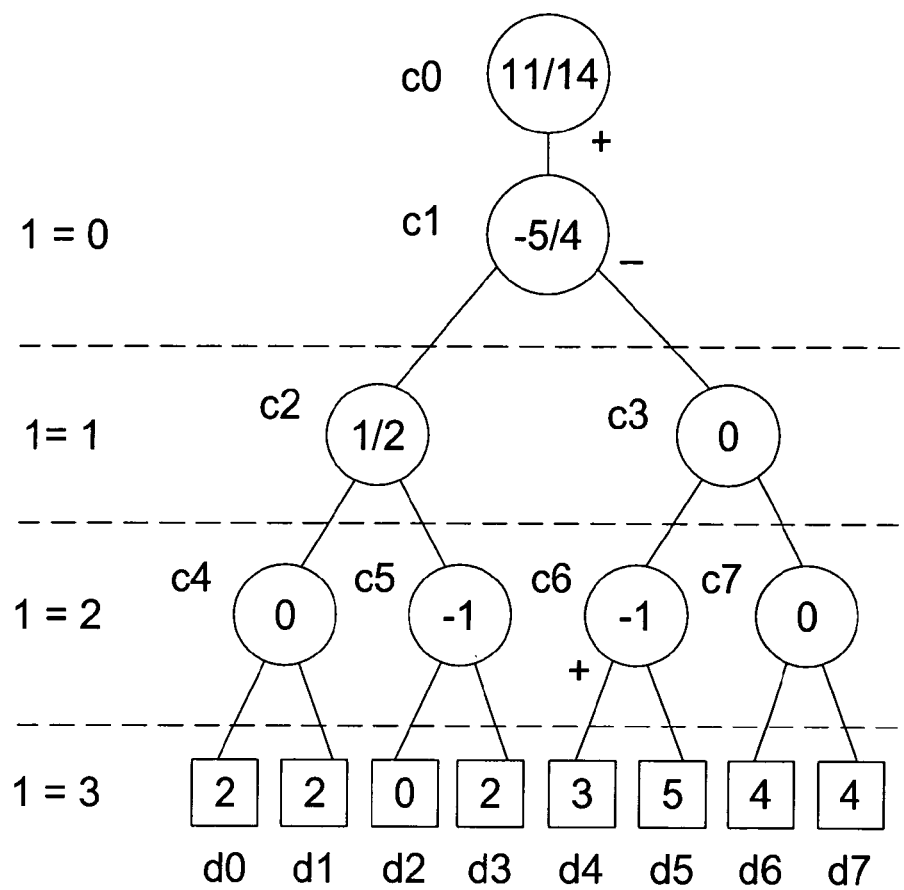
FIG. 1A depicts the error tree for a simple example data vector.

To facilitate understanding, identical reference numerals have been used, where possible, to designate identical elements that are common to the figures.

The invention will be primarily described within the general context of an embodiment of deterministic wavelet thresholding for maximum-error metrics. However, those skilled in the art and informed by the teachings herein will realize that the invention is applicable to database management, systems query processing, discrete mathematics, combinatorics, combinatorial algorithms, signal processing, image processing, performance, data synopses, wavelets, approximate query processing, and many other different kinds of data processing.

Approximate query processing over precomputed data synopses has emerged as a cost-effective approach for dealing with the huge data volumes, the high query complexities, and the increasingly stringent response-time requirements that characterize today's decision support systems (DSS) applications. Typically, DSS users pose very complex queries to the underlying database management system (DBMS) that require complex operations over gigabytes or terabytes of disk-resident data and, thus, take a very long time to execute to completion and produce exact answers. Due to the exploratory nature of many DSS applications, there are a number of scenarios in which an exact answer may not be required, and a user may in fact prefer a fast, approximate answer. For example, during a drill-down query sequence in ad-hoc data mining, initial queries in the sequence frequently have the sole purpose of determining the truly interesting queries and regions of the database. Providing (reasonably accurate) approximate answers to these initial queries gives user the ability to focus their explorations quickly and effectively, without consuming inordinate amounts of valuable system resources. An approximate answer can also provide useful feedback on how well-posed a query is, allowing DSS users to make an informed decision on whether they would like to invest more time and resources to execute their query to completion. Moreover, approximate answers obtained from appropriate synopses of the data may be the only available option when the base data is remote and unavailable. Finally, for DSS queries requesting a numerical answer (e.g., total revenues or annual percentage) it is often the case that the full precision of the exact answer is not needed and the first few digits of precision will suffice (e.g., the leading few digits of a total in the millions or the nearest percentile of a percentage.

Wavelets provide a mathematical tool for the hierarchical decomposition of functions, with a long history of successful applications in signal and image processing. Recent studies have also demonstrated the applicability of wavelets to selectivity estimation and to approximate query processing over massive relational tables and data streams. Briefly, the idea is to apply wavelet decomposition to the input relation (attribute column(s) or online analytical processing (OLAP) cube) to obtain a compact data synopsis that comprises a select small collection of wavelet coefficients. Some experimental results have demonstrated that fast and accurate approximate query processing engines can be designed to operate solely over such compact wavelet synopses.

A major shortcoming of conventional wavelet-based techniques for approximate query processing (including all the above-cited studies) is the fact that the quality of approximate answers can vary widely and no meaningful error guarantees can be provided to the users of the approximate query engine. Coefficients in conventional wavelet synopses are typically chosen to optimize the overall root-mean-squared (i.e., $L_2$-norm average) error in the data approximation, which, as demonstrated in a recent study, can result in wide variance as well as severe bias in the quality of the approximation over the underlying domain of data values. One proposed solution, termed probabilistic wavelet synopses, relies on probabilistic-thresholding schemes (based on randomized rounding) for synopsis construction that try to probabilistically control other approximation-error metrics, such as the maximum relative error in the data reconstruction. Such maximum relative-error metrics are arguably the most important for effective approximate query processing and can provide meaningful error guarantees for individual approximate answers. In order to probabilistically control maximum relative error, some algorithms previously proposed explicitly try to minimize appropriate probabilistic metrics (such as normalized standard error or normalized bias) for the randomized synopsis construction process. Similar schemes are also given for controlling maximum absolute error.

A potential problem with some probabilistic-thresholding techniques of the past is that, exactly due to their probabilistic nature, there is always a possibility of a bad sequence of coin flips resulting in a poor synopsis; furthermore, they are based on a quantization of the possible synopsis-space allotments, whose impact on the quality of the final synopsis is not entirely clear. A deterministic thresholding algorithm that explicitly minimizes the relevant maximum-error metric (e.g., maximum relative error) in the synopsis, is always guaranteed to give better results. Unfortunately, their thresholding algorithms depend critically on the probabilistic nature of their solution, and are inapplicable in a deterministic setting. An additional shortcoming of the probabilistic thresholding schemes is that they explicitly target only maximum-error metrics; it is not at all clear if or how they can be extended to other useful error measures for approximate query answers, such as, for example, mean relative error. In fact, one of the main open problems is whether it is possible to design efficient deterministic thresholding for minimizing non-$L_2$ error metrics that are relevant for approximate query answers, such as the maximum relative or absolute error in the data approximation.

Embodiments of the present invention include novel, computationally efficient schemes for deterministic wavelet thresholding with an objective of optimizing a general class of error metrics (e.g., maximum or mean relative error). An optimal low polynomial-time algorithm for one-dimensional wavelet thresholding is provided. This algorithm is based on a novel dynamic-programming (DP) formulation and can be employed to minimize either maximum relative error or maximum absolute error in the data reconstruction—its running time and working-space requirements are only $O(N^2)$ and $O(N \min \{B, \log N\})$ respectively, where N denotes the size of the data domain and B is the desired size of the synopsis (i.e., number of retained coefficients). Directly extending the optimal DP algorithm to multidimensional wavelets results in a super-exponential increase in time complexity with the data dimensionality rendering such a solution unusable even for the relatively small dimensionalities where wavelets are typically used (e.g., 2-5 dimensions). Thus, two embodiments of efficient polynomial-time approximation schemes (with tunable ϵ-approximation guarantees for the target maximum-error metric) for deterministic wavelet thresholding in multiple dimensions are provided. Both embodiments of the approximation schemes are based on approximate dynamic programs that tabulate a much smaller number of sub-problems than the optimal DP solution, while guaranteeing a small deviation from the optimal objective value. More specifically, one embodiment of the approximation algorithm gives ε-additive-error guarantees for maximum relative or absolute error, whereas the other embodiment is a (1+ε)-approximation scheme for maximum absolute error—the running time for both embodiments of the approximation schemes is roughly proportional to $$O\left(\frac{1}{\varepsilon}N\log^2 NB\log B\right).$$

Various embodiments of the present invention include efficient optimal and near-optimal algorithms for building wavelet synopses optimized for maximum-error metrics in one or multiple dimensions. These can be extended to handle a broad, natural class of distributive error metrics. This class includes several useful error measures for approximate query answers, such as mean weighted relative error and weighted $L_p$-norm error,

Wavelet Decomposition and Wavelet Data Synopses

Wavelets are a useful mathematical tool for hierarchically decomposing functions in ways that are both efficient and theoretically sound. Broadly speaking, the wavelet decomposition of a function consists of a coarse overall approximation together with detail coefficients that influence the function at various scales. The wavelet decomposition has excellent energy compaction and de-correlation properties, which can be used to effectively generate compact representations that exploit the structure of data. Furthermore, wavelet transforms can generally be computed in linear time.

One-Dimensional Haar Wavelets

Given the one-dimensional data vector A containing the N=8 data values A=[2,2,0,2,3,5,4,4], the Haar wavelet transform of A is computed as follows. First, average the values together pairwise to get a new lower resolution representation of the data with the following average values [2,1,4,4]. In other words, the average of the first two values (i.e., 2 and 2) is 2 that of the next two values (i.e., 0 and 2) is 1, and so on. Some information is lost in this averaging process. To be able to restore the original values of the data array, some detail coefficients are stored to capture the missing information. In Haar wavelets, these detail coefficients are simply the differences of the (second of the) averaged values from the computed pairwise average. Thus, in this simple example, for the first pair of averaged values, the detail coefficient is 0 since 2−2=0, for the second −1 is stored again since 1−2=−1. Note that no information has been lost in this process—it is fairly simple to reconstruct the eight values of the original data array from the lower-resolution array containing the four averages and the four detail coefficients. Recursively applying the above pairwise averaging and differencing process on the lower-resolution array containing the averages, we get the following full decomposition:

| Resolution | Averages | Detail Coefficients |
|---|---|---|
| 3 | [2, 2, 0, 2, 3, 5, 4, 4] | — |
| 2 | [2, 1, 4, 4] | [0, −1, −1, 0] |
| 1 | [3/2, 4] | [½, 0] |
| 0 | [11/4] | [−5/4] |

The wavelet transform (also known as the wavelet decomposition) of A is the single coefficient representing the overall average of the data values followed by the detail coefficients in the order of increasing resolution. Thus, the one-dimensional Haar wavelet transform of A is given by $W_A$=[11/4,−5/4,½,0,0,−1,−1,0]. Each entry in $W_A$ is called a wavelet coefficient. The main advantage of using $W_A$ instead of the original data vector A is that for vectors containing similar values most of the detail coefficients tend to have very small values. Thus, eliminating such small coefficients from the wavelet transform (i.e., treating them as zeros) introduces only small errors when reconstructing the original data, resulting in a very effective form of lossy data compression.

Note that, intuitively, wavelet coefficients carry different weights with respect to their importance in rebuilding the original data values. For example, the overall average is more important than any detail coefficient since it affects the reconstruction of all entries in the data array. In order to equalize the importance of all wavelet coefficients, the final entries of $W_A$ are normalized appropriately. A common normalization scheme is to divide each wavelet coefficient by $\sqrt{2^l}$, where l denotes the level of resolution at which the coefficient appears (with l=0 corresponding to the coarsest resolution level). Thus, the normalized coefficient $c_i^*$ is $c_i^*/\sqrt{2^{level(c_i)}}$.

Basic Haar Wavelet Properties and Notational Conventions

A helpful tool for exploring and understanding the key properties of the Haar wavelet decomposition is the error tree structure. The error tree is a hierarchical structure built based on the wavelet transform process (even though it is primarily used as a conceptual tool, an error tree can be easily constructed in linear O(N) time).

FIG. 1A depicts the error tree for the simple example data vector A. Each internal node $c_i$ (i=0, ..., 7) is associated with a wavelet coefficient value and each leaf $d_i$ (i=0, ..., 7) is associated with a value in the original data array; in both cases, the index i denotes the positions in the (data or wavelet transform) array. For example, $c_0$ corresponds to the overall average of A. Note that the values associated with the error tree nodes $c_j$ are the unnormalized coefficient values; the resolution levels l for the coefficients (corresponding to levels in the tree) are also depicted in FIG. 1A. The terms node, coefficient, and node/coefficient value are used interchangeably in what follows, even though they have distinct meanings. For ease of reference, Table 1 below summarizes some the notation for some symbols with brief descriptions of its semantics. Detailed definitions of all these parameters are provided at appropriate locations in this description. For simplicity, the notation assumes one-dimensional wavelets—extensions to multi-dimensional wavelets are straightforward. Additional notation is introduced when necessary.

TABLE 1

Notation

| Symbol<br>i ∈ {0 ... N − 1} | Description |
|---|---|
| N | Number of data-array cells |
| D | Data-array dimensionality |
| B | Space budget for synopsis |
| A, $W_A$ | Input data and wavelet transform arrays |
| $d_i$ | Data value for $i^{th}$ data-array cell |
| $\hat{d}_i$ | Reconstructed data value for $i^{th}$ array cell |
| $c_i$ | Haar coefficient at index/coordinate i |
| $T_i$ | Error subtree rooted at node $c_i$ |
| coeff($T_i$), data($T_i$) | Coefficient/data values in $T_i$ subtree |
| path(u) | All non-zero proper ancestors of node u in the error tree |
| s | Sanity bound for relative-error metric |
| $relErr_i$, $absErr_i$ | Relative/absolute error for data value $d_i$ |

Given a node u in an error tree T, let path(u) denote the set of all proper ancestors of u in T (i.e., the nodes on the path from u to the root of T, including the root but not u) with non-zero coefficients. A key property of the Haar wavelet decomposition is that the reconstruction of any data value $d_i$ depends only on the values of coefficients on path($d_i$); more specifically, $$d_i = \sum_{c_j \in path(d_i)} sign_{ij} \cdot c_j \quad (1)$$

where $sign_{ij} = +1$ if $d_i$ is in the left child subtree of cj or j=0, and $sign_{ij} = -1$ otherwise. Thus, reconstructing any data value involves summing at most log N+1 coefficient. For example, in FIG. 1A, $$d_4 = c_0 - c_1 + c_6 = \frac{11}{4} - \left(-\frac{5}{4}\right) + (-1) = 3.$$

The support region for a coefficient $c_i$ is defined as the set of (contiguous) data values that $c_i$ is used to reconstruct; the support region for a coefficient $c_i$ is uniquely identified by its coordinate i.

Multi-Dimensional Haar Wavelets

The Haar wavelet decomposition can be extended to multi-dimensional data arrays using two distinct known methods, namely the standard and nonstandard Haar decomposition. Each of these transforms results from a natural generalization of the one-dimensional decomposition process described above, and both have been used in a wide variety of applications, including approximate query answering over high-dimensional DSS data sets.

As in the one-dimensional case, the Haar decomposition of a D-dimensional data array A results in a D-dimensional wavelet coefficient array $W_A$ with the same dimension ranges and number of entries. Consider a D-dimensional wavelet coefficient W in the (standard or nonstandard) wavelet-coefficient array $W_A$. W contributes to the reconstruction of a D-dimensional rectangular region of cells in the original data array A (i.e., W's support region). Further, the sign of W's contribution (+W or −W) can vary along the quadrants of W's support region in A.

Figure 1B:
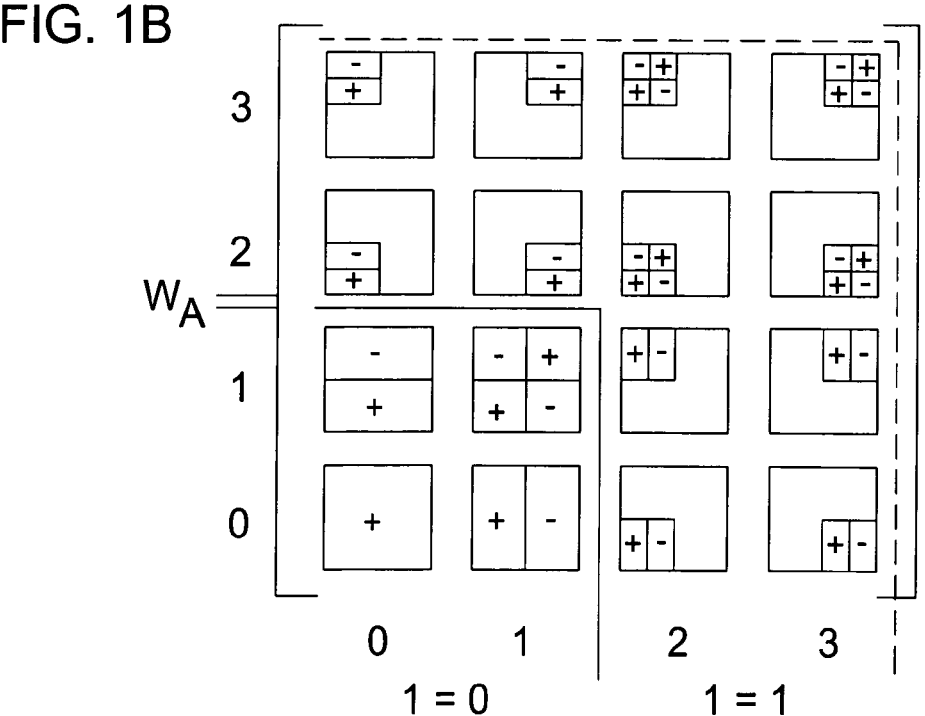
FIG. 1B depicts the support regions and signs of the sixteen nonstandard, two-dimensional Haar coefficients in the corresponding locations of a 4×4 wavelet-coefficient array $W_A$.

As an example, FIG. 1B depicts the support regions and signs of the sixteen nonstandard, two-dimensional Haar coefficients in the corresponding locations of a 4×4 wavelet-coefficient array $W_A$. The blank areas for each coefficient correspond to regions of A whose reconstruction is independent of the coefficient, i.e., the coefficient's contribution is 0. Thus, $W_A[0,0]$ is the overall average that contributes positively (i.e., $+W_A[0,0]$) to the reconstruction of all values in A, whereas $W_A[3,3]$ is a detail coefficient that contributes (with the signs shown in FIG. 1B) only to values in A's upper right quadrant. Each data cell in A can be accurately reconstructed by adding up the contributions (with the appropriate signs) of those coefficients whose support regions include the cell. FIG. 1B also depicts the two levels of resolution (l=0,1) for the example two-dimensional Haar coefficients; as in the one-dimensional case, these levels define the appropriate constants for normalizing coefficient values.

Error-tree structures for multi-dimensional Haar wavelets can be constructed (once again in linear O(N) time) in a manner similar to those for the one-dimensional case, but their semantics and structure are somewhat more complex. A major difference is that, in a D-dimensional error tree, each node (except for the root, i.e., the overall average) actually corresponds to a set of $2^D-1$ wavelet coefficients that have the same support region but different quadrant signs and magnitudes for their contribution. Furthermore, each (non-root) node t in a D-dimensional error tree has $2^D$ children corresponding to the quadrants of the (common) support region of all coefficients in $t^2$. The number of children (coefficients) for an internal error-tree node can actually be less than $2^D$ (resp., $2^D-1$) when the sizes of the data dimensions are not all equal. In these situations, the exponent for 2 is determined by the number of dimensions that are active at the current level of the decomposition (i.e., those dimensions that are still being recursively split by averaging/differencing. The sign of each coefficient's contribution to the leaf (data) values residing at each of its children in the tree is determined by the coefficient's quadrant sign information.

Figure 2:
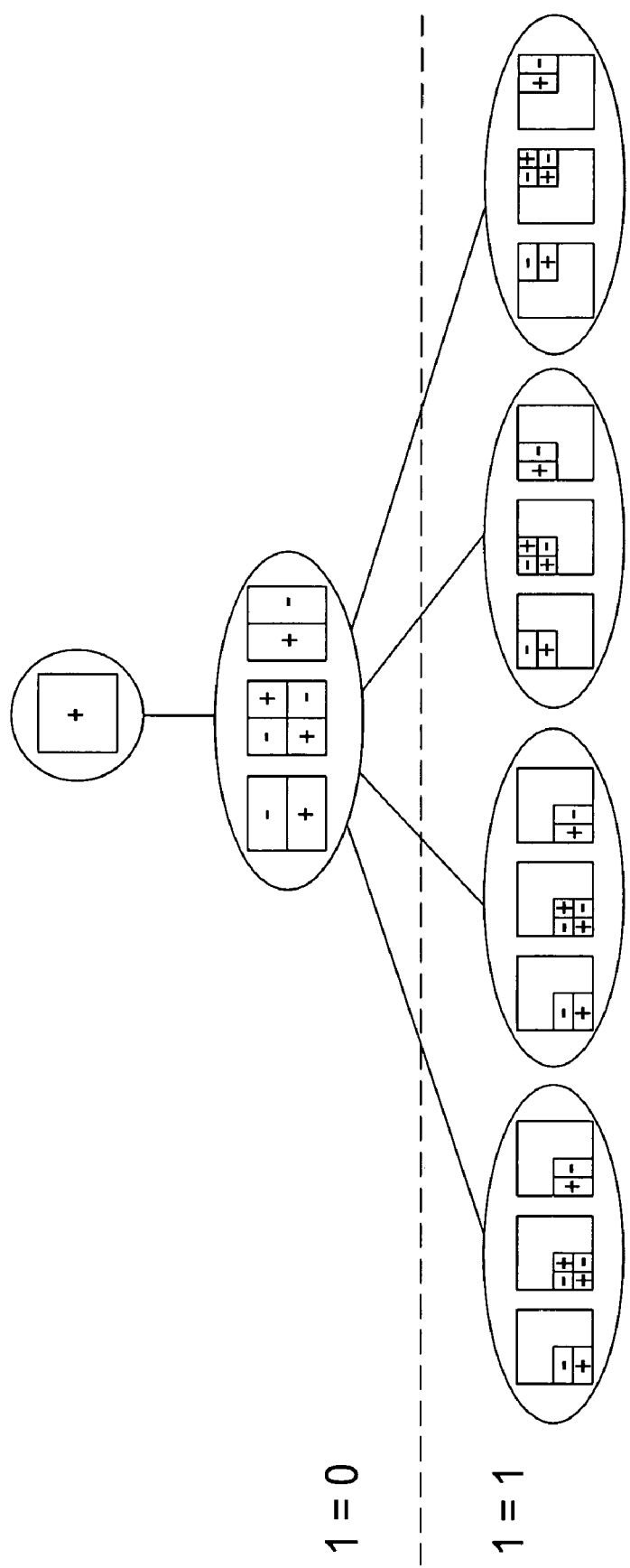
FIG. 2 depicts the error tree structure for the two-dimensional 4×4 Haar coefficient array in FIG. 1B.

As an example, FIG. 2 depicts the error-tree structure for the two-dimensional 4×4 Haar coefficient array in FIG. 1B. Thus, the (single) child t of the root node contains the coefficients $W_A[0,1]$, $W_A[1,0]$, and $W_A[1,1]$, and has four children corresponding to the four 2×2 quadrants of the array; the child corresponding to the lower-left quadrant contains the coefficients $W_A[0,2]$, $W_A[2,0]$, and $W_A[2,2]$, and all coefficients in t contribute with a plus sign (+) to all values in this quadrant.

Based on the above generalization of the error-tree structure to multiple dimensions, the formula for data-value reconstruction (Equation (1)) can naturally be extended to multi-dimensional Haar wavelets. Once again, the reconstruction of $d_i$ depends only on the coefficient sets for all error-tree nodes in path($d_i$), where the sign of the contribution for each coefficient W in node t∈path($d_i$) is determined by the quadrant sign information for W.

Wavelet-based Data Reduction: Coefficient Thresholding

Given a limited amount of storage for building a wavelet synopsis of the input data array A, a thresholding procedure retains a certain number B<<N of the coefficients in $W_A$ as a highly-compressed approximate representation of the original data (i.e., the remaining coefficients are implicitly set to 0). The goal of coefficient thresholding is to determine the best subset of B coefficients to retain, so that some overall error measure in the approximation is minimized. The method of choice for the vast majority of earlier studies on wavelet-based data reduction and approximation is conventional coefficient thresholding that greedily retinas the B largest Haar-wavelet coefficients in absolute normalized value. It is a well-known fact that this thresholding method is in fact provably optimal with respect to minimizing the overall root-mean-squared error (i.e., $L_2$-norm average error) in the data compression. More formally, letting $\hat{d}_i$ denote the (approximate) reconstructed data value for cell i, retaining the B largest normalized coefficients implies that the resulting synopsis minimizes the quantity $$\sqrt{\frac{1}{N}\sum_i (d_i - \hat{d}_i)^2}$$

(for the given amount of space B).

Unfortunately, wavelet synopses optimized for overall $L_2$ error may not always be the best choice for approximate query processing systems. As observed in a recent study, such conventional wavelet synopses suffer from several important problems, including the introduction of severe bias in the data reconstruction and wide variance in the quality of the data approximation, as well as the lack of non-trivial guarantees for individual approximate answers. To address these shortcomings, their work introduces novel, probabilistic thresholding schemes based on randomized rounding, that probabilistically round coefficients either up to a larger rounding value (to be retained in the synopsis) or down to zero. Intuitively, their probabilistic schemes assign each non-zero coefficient fractional storage y∈(0,1] equal to its retention probability, and then flip independent, appropriately-biased coins to construct the synopsis. Existing strategies are based on trying to probabilistically control the maximum relative error (with an appropriate sanity bound s) in the approximation of individual data values based on the synopsis; that is, they attempt to minimize the quantity $$\max_i \left\{ \frac{|\hat{d}_i - d_i|}{\max\{|d_i|, s\}} \right\},$$

(where $\hat{d}_i$ denotes the data value reconstructed based on the synopsis) with sufficiently high probability. More specifically, the existing algorithms are based on dynamic-programming (DP) formulations that explicitly minimize appropriate probabilistic metrics, such as the maximum normalized standard error (MinRelVar) or the maximum normalized bias (MinRelBias), in the randomized synopsis construction. These formulations are then combined with a quantization of the potential fractional-storage allotments to give combinatorial thresholding algorithms. Similar probabilistic schemes are also given for probabilistically controlling maximum absolute error.

Building and Using Wavelet Synopses in a DBMS

The construction of wavelet synopses typically takes place during a statistics collection process, whose goal is to create concise statistical approximations for the value distributions of either individual attributes or combinations of attributes in the relations of a DBMS. Statistics collection is usually an off-line process, carried out during night-time or other system-idling periods. Once created, such statistical summaries are typically stored as part of the DBMS-catalog information. More specifically, a wavelet synopsis comprising B wavelet coefficients is stored as a collection of B pairs {<$i_j$,$c_{ij}$>:j=1, . . . , B} where $i_j$ and $c_{ij}$ denote the index and value (respectively) of the $j^{th}$ retained synopsis coefficient.

Wavelet synopsis information in the DBMS catalog can be exploited for several different purposes. The primary (and, more conventional) use of such summaries is as a tool for enabling effective (compile-time) estimates of the result sizes of relational operators for the purpose of cost-based query optimization. For instance, estimating the selectivity of a range predicate like 1≦X≦h is equivalent to estimating the range summation $$f_x(l:h) = \sum_{i=l}^{h} f_x[i]$$

where $f_x$ is the frequency-distribution array for attribute X. It is not difficult to see that, given a B-coefficient synopsis of the $f_x$ array, computing $f_x(l:h)$ only involves coefficients in and, thus, can be estimated by summing only min {B,2 log N+1} synopsis coefficients. A B-coefficient wavelet synopsis can also be easily expanded (in O(B) time) into an O(B)-bucket histogram (i.e., piecewise-constant) approximation of the underlying data distribution with several possible uses (e.g., as a data visualization/approximation tool). Finally, wavelet-coefficient synopses can enable very fast and accurate approximate query answers during interactive data-exploration sessions (e.g., initial, drill-down query sequences in data-mining tasks). In fact, as efficient approximate query processing algorithms for complex select-project-join relational queries can be designed to operate entirely in the wavelet-coefficient domain.

Deterministic Wavelet Thresholding

Rather than trying to probabilistically control maximum relative error through the optimization of probabilistic measures (like normalized standard error or bias), a more direct solution is to design deterministic thresholding schemes that explicitly minimize maximum-error metrics. Such schemes can not only guarantee better synopses, but they also avoid the potential pitfalls of randomized techniques, as well as the space-quantization requirement of some known methods whose impact on the quality of the final solution is not entirely clear. Unfortunately, the DP formations and algorithms depend crucially on the ability to assign fractional storage (i.e., retention probability) values in (0,1] to individual coefficients, which renders their schemes inapplicable for deterministic wavelet thresholding (where the storage assigned to each coefficient is either 0 or 1). In fact, one of the main open problems is whether it is possible to design efficient algorithms for deterministic Haar-coefficient thresholding for minimizing non-$L_2$ error metrics that are relevant for approximate query answers, such as maximum relative or absolute error in the data approximation. Embodiments of the present invention attack this problem for both one- and multi-dimensional Haar wavelets. Unlike the probabilistic schemes, embodiments of the present invention are applicable to a general class of approximation-error metrics, including, for example, mean weighted relative error.

One-Dimensional Wavelet Thresholding

One exemplary embodiment is a novel, simple, low polynomial-time scheme based on Dynamic-Programming (DP) for building deterministic Haar-wavelet synopses that minimize the maximum relative or absolute error in the data-value approximation. More formally, let $$relErr_i = \frac{|\hat{d}_i - d_i|}{\max\{|d_i|, S\}}$$

be an error metric that combines relative error with an appropriate sanity bound s and, similarly, let absErr$_i$=|$\hat{d}_i$−$d_i$| denote the absolute approximation error for the ith data value. The deterministic wavelet thresholding problem is formally defined as follows.

Deterministic Maximum Relative/Absolute Error Minimization

Given a synopsis space budget B, determine a subset of at most B Haar-wavelet coefficients that minimize the maximum relative (or, absolute) error in the data-value approximation; that is, for err ∈{relErr,absErr} minimize $\max_{i \in \{0, \ldots, N-1\}}\{err_i\}$.

Note that unlike the probabilistic normalized standard error or normalized bias metrics employed in known works, embodiments of the present invention including relErr and absErr metrics do not have a simple monotonic/additive structure over the Haar-coefficient error tree. The key problem, of course, is that, even though data values are simple linear combinations of coefficients, each coefficient contributes with a different sign on different parts of the underlying data domain. This also implies that the DP formulations are no longer applicable, since the assumed principle of optimality for error subtrees is no longer valid. In other words, due to the absence of additive/monotonic structure for the objective, the optimal solution for the subtree rooted at node $c_j$ is not necessarily a combination of the optimal (partial) solutions for $c_j$'s child subtrees.

Exemplary embodiments of a DP recurrence and algorithm for a deterministic maximum-error optimization problem condition the optimal error value for an error subtree not only on the root node $c_j$ of the subtree and the amount B of synopsis storage allotted, but also on the error that enters that subtree through the coefficient selections made on the path from the root to node $c_j$ (excluding $c_j$ itself), i.e., coefficient selections on path $(c_j)$. Since the depth of the error tree is O(log N), all such possible selections can be tabulated while keeping the running-time of the algorithm in the low-polynomial range.

More formally, let B denote the total space budget for the synopsis, and let $T_j$ be the subtree of the error-tree rooted at node $c_j$, with coeff($T_j$)(data($T_j$)) denoting the set of coefficient (resp., data) values in $T_j$. Finally, let M[j,b,S] denote the optimal (i.e., minimum) value of the maximum error (relative or absolute) among all data values in Tj assuming a synopsis space budget of b coefficients for the Tj subtree, and that a subset $S \subseteq \text{path}(c_j)$ (of size at most min{B−b, log N+1}) of proper ancestors of cj have been selected for the synopsis; that is, assuming a relative-error metric (i.e., err=relErr), $$M[j, b, S] = \min_{S_j \subseteq \text{coeff}(T_j), |S_j| \leq b} \left\{ \max_{d_i \in \text{data}(T_j)} \text{relErr}_i \right\},$$

where $$\text{relErr}_i = \frac{\left| d_i - \sum_{c_k \in \text{path}(d_i) \cap (S_j \cup S)} \text{sign}_{ik} \cdot c_k \right|}{\max\{|d_i|, S\}}.$$

The case for absolute error (i.e., err=absErr) is defined similarly. A DP recurrence for computing the M[j,b,S] entries is formulated as follows. M[0,B,φ] gives the desired optimal error value at the root node of the error tree. The corresponding error-optimal wavelet synopsis is then built by simply retracing the choices of the DP computations using known techniques.

The base case for the recurrence occurs for data (i.e., leaf) nodes in the Haar error tree; that is, for $c_j = d_{j−N}$ with $j \geq N$. (See FIG. 1A). In this case, M[j,b,S] is not defined for b>0, whereas for b=0 and for each subset $S \subseteq \text{path}(d_{j−N})$ (of size≦min {B, log N+1}) define $$M[j, 0, S] = \frac{\left| d_j - N - \sum_{c_k \in S} \text{sign}_{j-N,k} \cdot c_k \right|}{r},$$

where r=max $\{|d_{j−N}|, S\}$ for err=relErr, and r=1 for err=absErr.

In the case of an internal error-tree node $c_j$ with j<N, the DP algorithm has two distinct choices when computing M[j,b,S], namely either drop coefficient $c_j$ or keep it in the final synopsis. If we choose to drop $c_j$ from the synopsis, then it is easy to see that the maximum error from cj's two child subtrees (i.e., $c_{2j}$ and $c_{2j+1}$) will be propagated upward; thus, the minimum possible maximum error M[j,b,S] for Tj in this case is simply $$\min_{0 \leq b' \leq b} \max\{M[2j, b', S], M[2j + 1, b - b', S]\}. \quad (2)$$

In the above recurrence, S contains proper ancestors of cj that are clearly proper ancestors of $c_{2j}$ and $c_{2j+1}$ as well; thus, the right-hand side of the recurrence is well-defined as the DP computation proceeds bottom-up to reach cj. If, on the other hand, $c_j$ is kept in the synopsis (assuming, of course, b≧1), the least possible error M[j,b,S] for Tj is computed as $$\min_{0 \leq b' \leq b-1} \max\{M[2j, b', S \cup \{c_j\}], M[2j + 1, b - b', S \cup \{c_j\}]\}. \quad (3)$$

Again, the right-hand side of the recurrence is well-defined. The final value for M[j,b,S] defined as the minimum of the two possible choices for coefficient cj, i.e., equations (2) and (3) above. A pseudo-code description of an exemplary embodiment of an optimal DP algorithm for deterministic maximum-error thresholding in one dimension (termed Min-MaxErr) is shown Table 2 below.

TABLE 2

An exemplary embodiment of the MinMaxErr Algorithm: Optimal Deterministic Thresholding for Maximum Error in One Dimension.

procedure MinMaxErr($W_A$,B,root,S,err)
Input: Array $W_A$ = [$c_0$, ..., $C_{N-1}$] of N Haar wavelet coefficients, space budget B (number of retained coefficients), error-subtree root-node index root, subset of retained ancestors of root node S ⊆ path(root), target maximum error metric err.
Output: Value of M[root,B,S] according to the optimal dynamic program (M[root,B,S].value), decision made for the root node (M[root,B,S].retained), and space allotted to left child subtree (M[root,B,S].leftAllot). (The last two are used for retracing the optimal solution to build the synopsis.)
begin
1.   if (M[root,B,S].computed = true) then
2.   return M[root,B,S].value // optimal value already in M[ ]
3.   if (N ≦ root < 2N) then // leaf/data node
4.   if (B = 0) then

5.

$$M[\text{root}, B, S].\text{value} := \left| d_{j-N} - \sum_{ck \in S} \text{sign}_{j-N, k \cdot C_k} \right|$$

6.   if (err = relErr) then

7.

$$M[\text{root}, B, S].\text{value} := \frac{M[\text{root}, B, S].\text{value}}{\max\{|d_{j-N}, S|\}}$$

8.   endif
9.   else
10.  M[root,B,S].value := ∞
11.  for b := 0 to B step 1 do // first choice; drop root
12.  left := MinMaxErr($W_A$,B-b,2*root,S,err)
13.  right := MinMaxErr($W_A$,B - b,2*root + 1,S,err)
14.  if (max{left,right} < M[root,B,S].value) then
15.  M[root,B,S].value max{left,right}
16.  M[root,B,S].retained := false
17.  M[root,B,S].leftAllot := b
18.  endif
19.  endfor
20.  for b := 0 to B - 1 step 1 do // second choice; keep root
21.  left := MinMaxErr($W_A$,b,2*root,S ∪ {root},err)

TABLE 2-continued

An exemplary embodiment of the MinMaxErr Algorithm: Optimal Deterministic Thresholding for Maximum Error in One Dimension.

Figure 3:
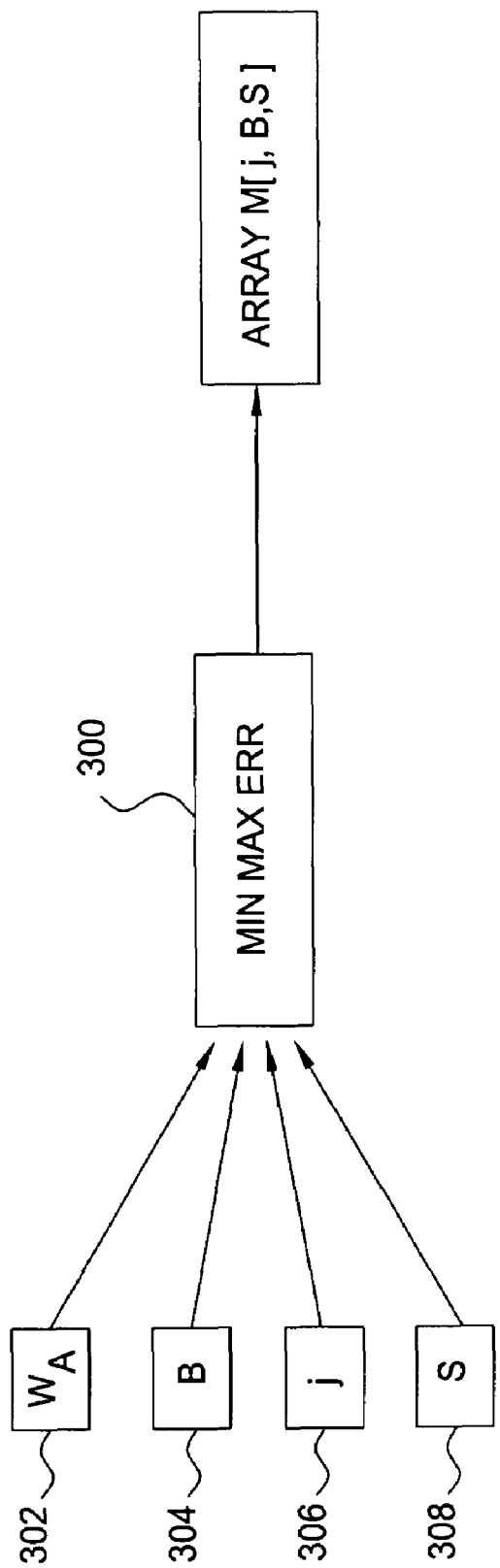
FIG. 3 is a block diagram showing the input and output for an exemplary method of optimal deterministic thresholding for maximum error in one dimension (MinMaxErr)

22.   right = MinMaxErr($W_A$,B - b - 1,2*root + 1,S ∪ {root},err)
23.   if (max{left,right} < M[root,B,S].value) then
24.     M[root,B,S].value = max{left,right}
25.     M[root,B,S].retained = true
26.     M[root,B,S].leftAllot = b
27.   endif
28.   endfor
29. endif
30. M[root,B,S].computed = true
31. return(M[root,B,S].value)
end FIG. 3 shows the input and output for the exemplary method of optimal deterministic thresholding for maximum error in one dimension (MinMaxErr) 300, for which pseudo code is shown in Table 2 above. The input includes a wavelet array ($W_A$) 302, a number of retained coefficients (B) 304, subtree root index (j) 306, and a subset of retained coefficients (S) 308 on a path from root to j 306. The output includes an array M[j,B,S], which is an optimal (minimum) maximum relative error for all data values in the j-subtree for a synopsis size B, assuming coefficients in S are retained above j.

Figure 4A:
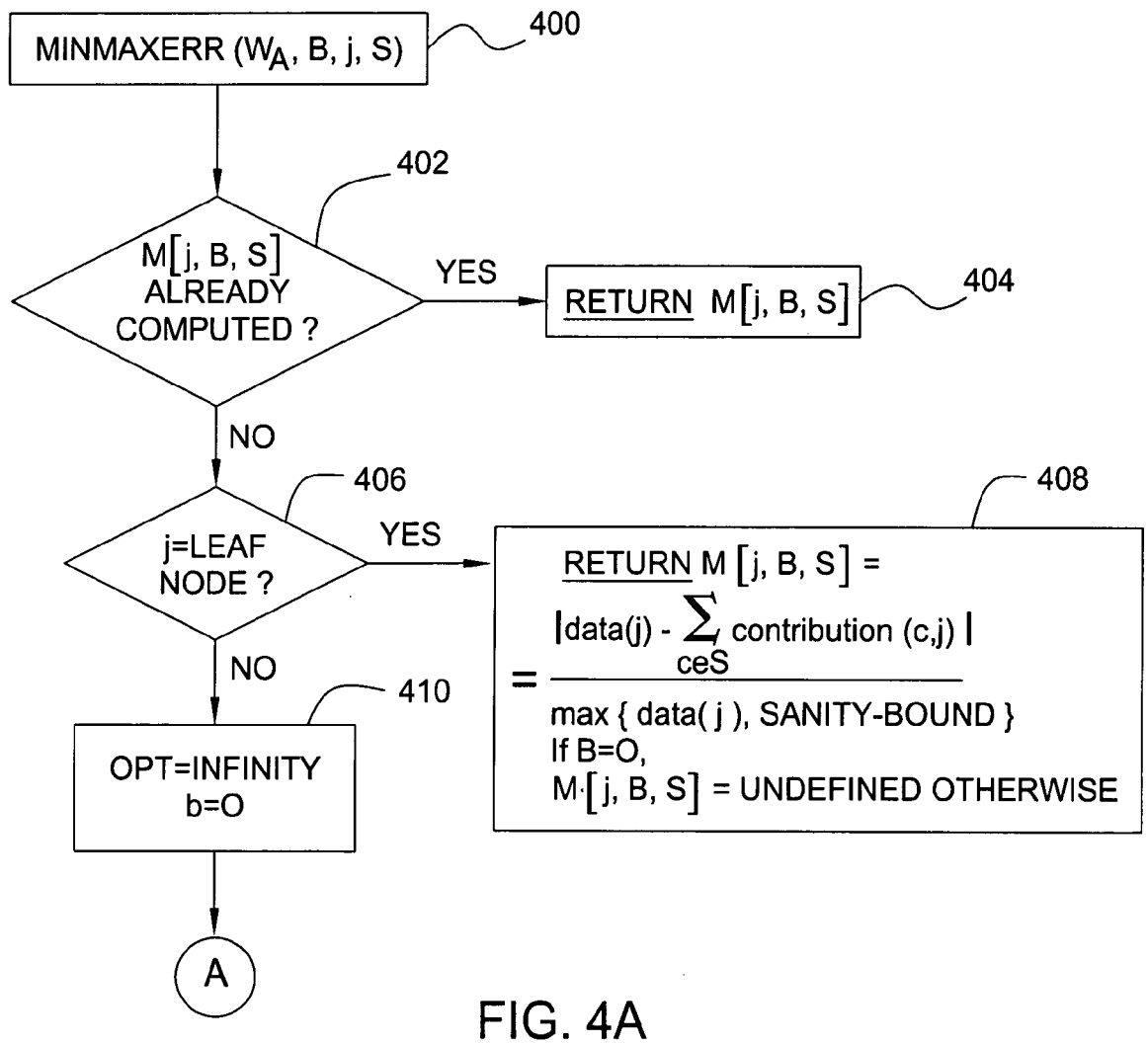
FIGS. 4A, 4B, and 4C are flowcharts describing the exemplary method MinMaxErr of FIG. 3.
Figure 4B:
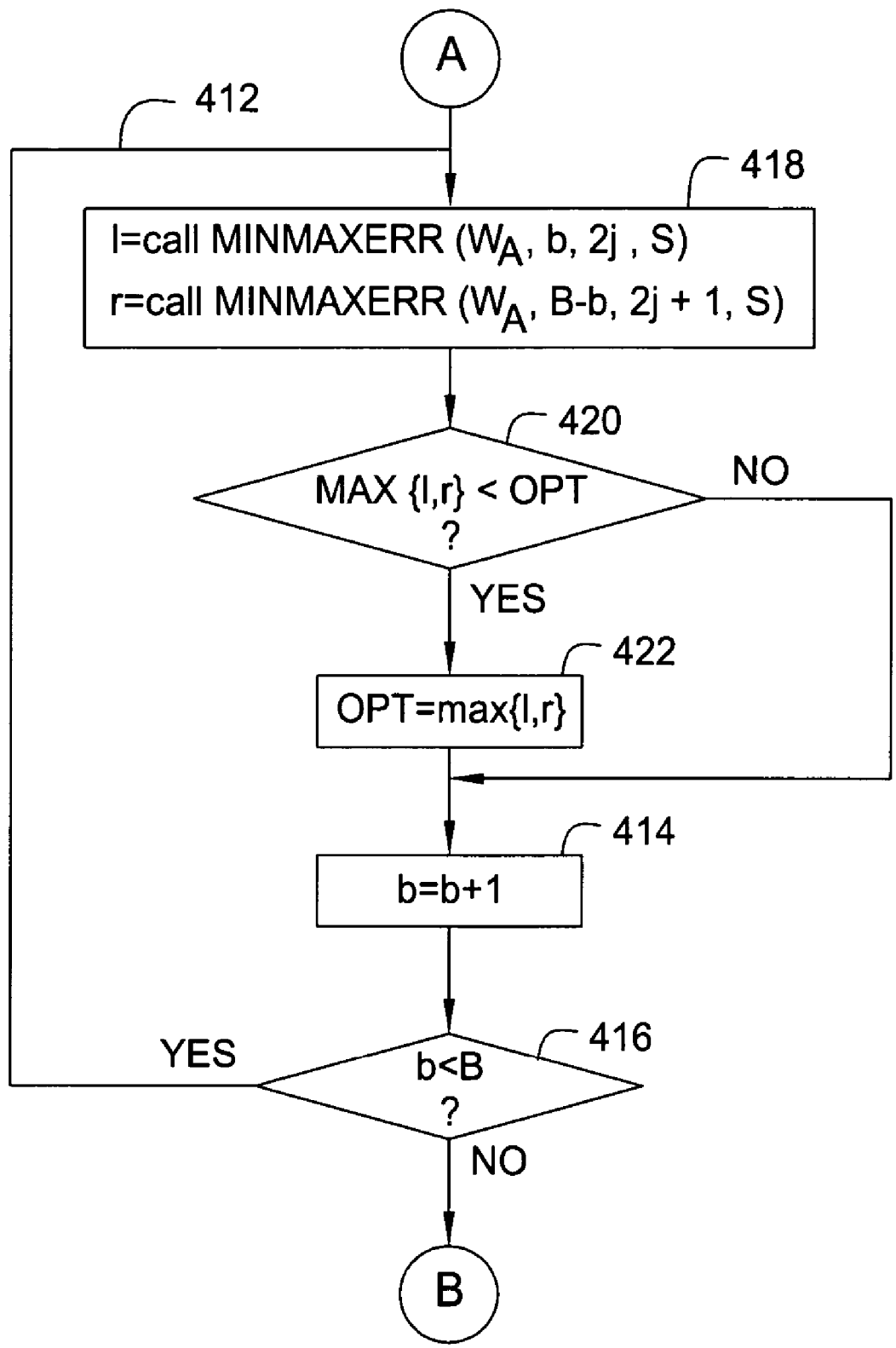
Figure 4C:
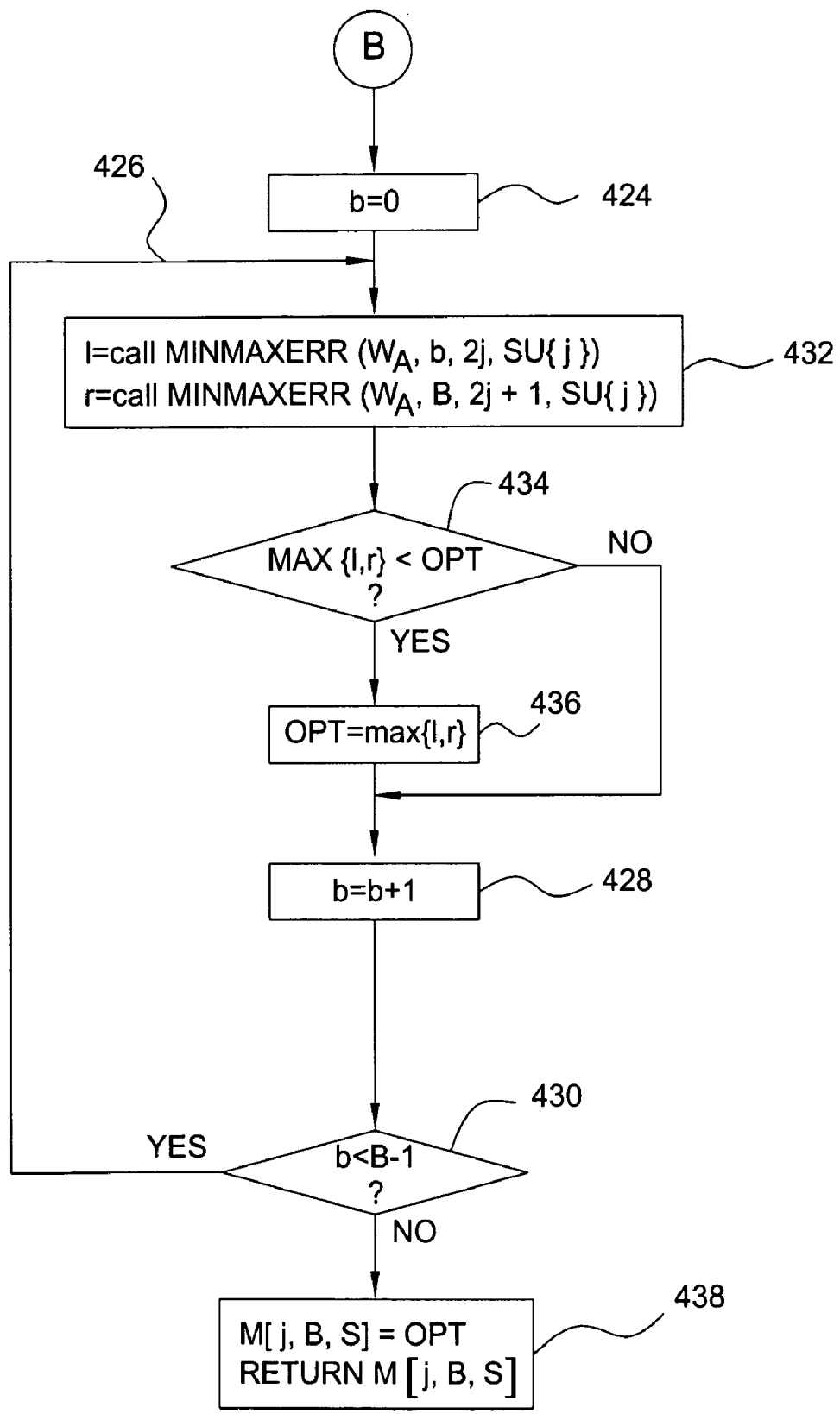

FIGS. 4A-4C are flowcharts describing the exemplary method (MinMaxErr) 300 of FIG. 3. In this exemplary method, procedure MinMaxErr starts at 400 and determines whether M[j,B,S] has already been computed at 402. If so, M[j,B,S] is returned at 404; otherwise it is determined whether j is a leaf node at 406. If so, M[j,B,S] is computed using a formula or set to be undefined if b is zero and returned at 408; otherwise, set OPT to infinity and b to 0 at 410.

Looping over b from zero to B 412, 414, 416, left is set to the result of calling MinMaxErr 400 with one set of variables, while right is set to the result of calling MinMaxErr 400 with a different set of variables at 418. Thus, the procedure is called recursively within the loop. Next, it is determined whether the maximum of left and right are less than OPT at 420. If so, then OPT is set to the maximum of left and right at 422 and the loop continues until b is not less than B at 416.

Then, b is initialized to zero at 424 outside another loop over b from zero to B–1 426, 428, 430. Again, left is set to the result of calling MinMaxErr 400 with one set of variables, while right is set to the result of calling MinMaxErr 400 with a different set of variables at 432. Next, it is determined whether the maximum of left and right is less than OPT at 434. If so, then OPT is set to the maximum of left and right at 436 and the loop continues until b is not less than B at 430.

Time and Space Complexity

Given a node/coefficient $c_j$ at level l of the error tree, the exemplary MinMaxErr algorithm considers at most B+1 space allotments to the $T_j$ subtree (where the "+1" accounts for the possibility of zero space) and at most $2^{l+1}$ subsets of ancestors of $c_j$. Thus, the number of entries in the DP array M[ ] that need to be computed for $c_j$ is $O(B2^{l+1})$. Furthermore, the time needed to compute each such entry is O(log B). To see this, note that for any fixed node k and ancestor subset S, M[k,b',S] is a decreasing function of the space allotment b'. Thus, the optimal distribution point b' in equations (2) and (3) (Steps 11-28 in MinMaxErr) is computed using an O(log B)-time binary search procedure, looking for the space allotment where the error values for the two child subtrees are equal or the adjacent pair of cross-over allotments. (To simplify the description, this binary-search procedure is not shown in the pseudo-code description in Table 2.) Clearly, the total number of error-tree nodes at level l is $O(2^l)$ making the overall time complexity of our DP algorithm $$O\left(\sum_{l=0}^{\log N} 2^l 2^{l+1} B \log B\right) = O\left(B \log B \sum_{l=0}^{\log N} 2^{2l}\right) = O(N^2 B \log B).$$

Given an internal node $c_j$ at level l of the error tree and a synopsis budget B, the number of coefficients that can be retained inside the $T_j$ subtree is actually upper bounded by min $\{B, 2^{\log N-l} - 1\}$ (since $T_j$ comprises at most $2^{\log N-l} - 1$ coefficient nodes. Thus, the number of entries for $c_j$ in the M[ ] array is at most $O(2^{l+1} \min \{B+1, 2^{\log N-l}\}) = O(\min \{B2^{l+1}, 2N\})$ with each entry requiring O(min {log B, log N-l}) computation time. Summing across all error tree nodes (as above) using these tighter bounds gives an overall time complexity of only $O(N^2)$ for the exemplary embodiment of the DP algorithm.

With respect to the space requirements of exemplary embodiments of the scheme, it is easy to see that the overall size of the DP array MP[ ] is $$O\left(\sum_{l=0}^{\log N} 2^l \min\{B2^{l+1}, 2N\}\right) \le O\left(N \sum_{l=0}^{\log N} 2^l\right) = O(N^2).$$

Note that, however, the exemplary MinMaxErr algorithm does not actually require the entire DP array to be memory-resident at all times. For instance, the results for all descendants of a node $c_j$ are no longer needed and can be swapped out of memory once the results for node $c_j$ have been computed. With this small optimization, it is easy to see that the exemplary bottom-up DP computation never requires more than one active line (i.e., entries corresponding to a single tree node) of the M[ ] array per error-tree level, where the size of such a line for a node at level l is O(N min {B, log N}). Thus, the size of the memory-resident working set for the exemplary DP algorithm drops to only $$O\left(\sum_{l=0}^{\log N} \min\{B2^{l+1}, 2N\}\right) = O(N \min\{B, \log N\}).$$

In summary, for the one-dimensional case, the exemplary MinMaxErr algorithm is an optimal deterministic thresholding scheme for building one-dimensional wavelet synopses that minimizes the maximum relative error (or maximum absolute error) in the data approximation. MinMaxErr runs in time $O(N^2)$ and has a total-space (working-space) requirement of $O(N^2)$ (resp., O(N min {B.log N})).

Multi-Dimensional Wavelet Thresholding

The deterministic wavelet thresholding problem becomes significantly more complex for multi-dimensional wavelets, and directly extending the exemplary embodiment of the optimal one-dimensional DP formulation to the case of multiple dimensions fails to give a practical solution. As described above, in the D-dimensional error-tree structure, even though the tree depth remains O(log N), each node in the tree now contains up to $2^D - 1$ wavelet coefficients with the same support region and different quadrant signs (FIG. 2). This implies that the total number of possible ancestor subsets S for a multi-dimensional coefficient at a level l=Θ(log N) is $O(2^{\log\ N-(2^D-1)}) = O(N^{2^2-1})$, rendering the exhaustive-enumeration DP scheme described above completely impractical, even for the relatively small data dimensionalities (i.e., D=2-5) where wavelet-based data reduction is typically employed. It is well known that, due to the dimensionality curse, wavelets and other space-partitioning schemes become ineffective above 5-6 dimensions.

There are two exemplary embodiments of efficient polynomial-time approximation schemes for deterministic multidimensional wavelet thresholding for maximum-error metrics. Both the approximation schemes are based on approximate dynamic programs that explore a much smaller number of options than the optimal DP formulation, while offering tunable $\epsilon$-approximation guarantees for the final target maximum-error metric. More specifically, our first scheme can give $\epsilon$-additive-error guarantees for maximum relative or absolute error, whereas the second scheme is a $(1+\epsilon)$-approximation algorithm for maximum absolute error.

An $\epsilon$-Additive-Error Approximation Scheme for Absolute/Relative Error Minimization Intuitively, the optimal one-dimensional DP scheme is based on exhaustively enumerating, for each error subtree, all the possible error values entering the subtree through the choices made on the path to the subtree's root node. The first approximation scheme avoids this exhaustive enumeration and, instead, tries to approximately cover the range of all possible error contributions for paths up to the root node of an error subtree using a much smaller number of (approximate) error values. The exemplary embodiment of the approximation scheme is then based on a much sparser DP formulation, which only tabulates this smaller set of error values.

Specifically, let R denote the maximum absolute coefficient value in the error tree and let $\epsilon<1$ denote the desired approximation factor. The additive contribution to the absolute data-value reconstruction error from any possible path in the error tree is guaranteed to lie in the range $\Re = [-R2^D \log N, +R2^D \log N]$. The approximation scheme covers the entire $\Re$ range using error-value breakpoints of the form $\pm(1+\epsilon)^k$, for a range of (contiguous) integer values for the exponent k. Note that the number of such breakpoints needed is essentially $$O(\log_{1+\epsilon}(2R2^D \log N) \approx O\left(\frac{D + \log R + \log\log N}{\epsilon}\right),$$

for small values of $\epsilon<1$; in other words, $$k \in K = \left\{0, 1, \ldots, O\left(\frac{D + \log R + \log\log N}{\epsilon}\right)\right\}.$$

Now, let $\text{round}_\epsilon(v)$ be a function that rounds any value $v \in \Re$ down to the closest value in the set $E = \{0\} \cup \{\pm(1+\epsilon)^k, k \in K\}$; that is, letting $l = \log_{1+\epsilon}|v|$, we have $\text{round}_\epsilon(v) = 1 + \epsilon^l$ if $v \geq 1$, $(1+\epsilon)^l$ if $v \leq -1$, and 0 otherwise. The DP array $M^a[\ ]$ for the approximation scheme tabulates the values $M^a[j,b,e]$ capturing the approximate maximum error (relative or absolute) in the $T_j$ error subtree (rooted at node j), assuming a space budget of b coefficients allotted to $T_j$ and an approximate/rounded additive error contribution of $e \in E$ due to proper ancestors of node j being discarded from the synopsis.

The base case for the computation of $M^a[\ ]$, i.e., the case of a leaf/data node $j \geq N$ in the error tree is fairly straightforward; once again, $M^a[j,b,e]$ is only defined for $b=0$ and $M^a[j,b,e] = |e|/r$, where r is either max $\{|d_{j-N}|, S\}$ or 1 depending on whether a relative or absolute error metric is being targeted.

In the case of an internal error-tree node j, each node now corresponds to a set S(j) of at most $2^D-1$ (non-zero) coefficients, and has at most $2^D$ child subtrees (with indices, say $j_1, \ldots, j_m$). Assume that a subset $s \subseteq S(j)$ of node j's coefficients in the synopsis is chosen to be maintained and, for each coefficient $c \in S(j)$, let $\text{sign}(c,j)$ denote the sign of c's contribution to the $j_i$ child subtree; then, the least possible maximum error entries $M^a[j,b,e], e \in E$ are estimated for Tj (assuming, of course, that $b \geq |s|$) as $$\min_{0 \leq b_1 + \ldots + b_m \leq b - |s|} \max_{1 \leq i \leq m} \left\{M^a\left[j_i, b_i, \text{round}_\epsilon\left(e + \sum_{c \in S(j)-s} \text{sign}(c, j_i) \cdot c\right)\right]\right\}.$$

In other words, for a given selected coefficient subset s, all possible allotments of the remaining b-|s| space to children of node j are considered with the rounded cumulative error that enters those children taking into account the contribution from the dropped coefficients in S(j)-s. To avoid the $O(B^{2^D})$ factor in run-time complexity implied by the search of all possible space allotments $b_1, \ldots, b_m$ to child subtrees in the above recurrence, the search is simply ordered among a node's children. The basic idea is to generalize the approximate DP-array entries to $M^a[j,b,e]$, where $j=(j_1, \ldots, j_k)$ is a list of error-tree nodes and $e=(e_1, \ldots, e_k)$ is a list of incoming additive errors corresponding to the nodes in j. The above recurrence for $M^a[(j),b(e)]$ then becomes simply $$M^a[(j), b, (e)] = \min_{s \subseteq S(j)} \{M^a[(j_2, \ldots, j_m), b - |s|, (e_1, \ldots e_m)]\}, \text{ where}$$

$$e_k = \text{round}_\epsilon\left(e + \sum_{c \in S(j)-s} \text{sign}(c, j_k) \cdot c\right) \text{ for } k = 1, \ldots, m \text{ and}$$

$$M^a[(j_1, \ldots, j_m), b', (e_1, \ldots, e_m)] =$$

$$\min_{0 \leq b'' \leq b'} \max\{M^a[(j_1), b'', (e_1)], M^a[(j_2, \ldots, j_m), b' - b'', (e_2, \ldots, e_m)]\}$$

. Intuitively, the first equation states that the approximate error value $M^a[(j),b,(e)]$ at node j is computed as the minimum (over all possible choices for the subset $s \subseteq S(j)$ of retained coefficients at j) of the corresponding approximate error values for the list of node j's children. The second equation then computes the approximate error values for this list $(j_1, \ldots, j_m)$ by exploring all possible allotments of a given space budget b' between the first child $(j_1)$ and the list suffix of all remaining children $(j_2, \ldots, j_m)$ of node j.

To see how this generalization affects the space complexity of the exemplary DP formulation, note that, assuming a given node j in the error tree: (1) there are at most $2^D$ possible different values for the list suffix j of child error-tree nodes of j; and (2) for each such list suffix j and each possible incoming error value $e \in E$ at node j, there are at most $2^{2^D-1}$ possible different values for the corresponding list of child error values e (i.e., one for each possible subset $$s \subseteq S(j)$$

of retained coefficients at j). Thus, given that we obviously have O(B) choices for the b parameter, it is easy to see that the overall space requirements of the exemplary generalized DP array are $O(|E|2^{2^D+D}NB)$. Again, D is a small constant, typically between 2-5. In terms of time complexity, note that the exemplary generalization also allows for an O(log B)-time search for the breakup of a node's allotment to its children *using binary search in the above recurrence). Thus, the overall time complexity of the exemplary DP is O(|E|$2^{2^D+D}$ NB log B).

In summary, the above-described approximation scheme for deterministic multi-dimensional wavelet thresholding discovers an approximate solution that is guaranteed to be within a worst-case additive error of $\epsilon R$(resp.,$\epsilon R/S$) of the optimal (i.e., minimum) maximum absolute (resp., relative) error in time $$O\left(\frac{D + \log R + \log\log N}{\varepsilon} 2^{2^D + 2D} N \log^2 N \log B\right)$$

and with a total space requirement of $$O\left(\frac{D + \log R + \log\log N}{\varepsilon} 2^{2D + 2D} NB \log^2 N\right).$$

Proof: The goal is to demonstrate that the exemplary approximation scheme produces a solution that is within a small additive error of the optimal solution. Only the case of absolute error is considered, as the argument for relative error is similar. Let $M[j,b,e] = M[(j_1, \ldots, j_m), b(e_1, \ldots, e_m)]$ denote the optimal absolute error value when allowed a coefficient synopsis of size b in the list of error subtrees $(T_{j_1}, \ldots, T_j)$, assuming an incoming additive error of $e_{j_k}$ at subtree $T_{j_k}$ (due to its discarded ancestor coefficients), where $k=1, \ldots, m$. Thus, the goal is to upper-bound the absolute difference $|M^a[(\text{root}),B,(0)] - M[(\text{root}),B,(0)]|$.

Let the height of an error-tree node denote its distance from the error-tree leaf (i.e., data) nodes (i.e., the leaves are at height 0). Induction is used to demonstrate the following claim. Claim: if the tree nodes in list $j=(j_1, \ldots, j_m)$ are at height i, then, for any space allotment b and error-value list e, $|M^a[j,b,e] - M[j,b,e]| \leq (i+1) \cdot \epsilon 2^D$ R log N.

Let N(j) denote the number of nodes in the subtrees rooted at all nodes in j; that is, $N(j) = |T_{j_1} \cup \ldots \cup T_{j_m}|$. The proof of the above claim is based on an inductive argument on N(j). For the base case, note that if j comprises only a leaf node, then the claim is clearly true by the construction of the exemplary approximate breakpoint set E. Now, assume that the claim is true for all lists j' with N(j')<n, and let j be a node list such that N(j)=n; also, assume that the nodes in j are at height i in the error tree.

Consider the simpler case where j comprises a single node j, i.e., $j=(j)$ and let $(j_1, \ldots, j_m)$ denote the list of children of node j. Recall that $$M^a[(j), b(e)] = \min_{s \subseteq S(j)} \{M^a[(j_1, \ldots, j_m), b - |s|, (e_1, \ldots, e_m)]\} \quad (4)$$

where $$e_k = \left(e + \sum_{c \in S(j)-s} \text{sign}(c, j_k) \cdot c\right) \text{ for } k = 1, \ldots, m.$$

Now, let $$e'_k = \left(e + \sum_{c \in S(j)-s} \text{sign}(c, j_k) \cdot c\right) \text{ for } k = 1, \ldots, m$$

and it is easy to see that the corresponding optimal error value at node j is defined similarly as $$M[(j), b, (e)] = \min_{s \subseteq S(j)} \{M[(j_1, \ldots, j_m), b - |s|, (e'_1, \ldots, e'_m)]\}. \quad (5)$$

For the sake of brevity, let $j_c = (j_1, \ldots, j_m)$, $e = (e_1, \ldots, e_m)$, and $e' = (e'_1, \ldots, e'_m)$. By the inductive hypothesis, for any choice of the s subset, $$|M^a[j_c, b-|s|, e] - M[j_c, b-|s|, e]| \leq i \cdot \epsilon 2^D R \log N. \quad (6)$$

Now, assume it is wanted to compute the optimal error value for $j_c$ with the unrounded incoming additive errors, i.e., $M[j_c, b-|s|, e']$. Clearly, an upper bound for this error can be obtained by retaining those coefficients corresponding to the optimal value with the rounded incoming errors (i.e., $M[j_c, b-|s|, e]$), and then adding the rounding error $|e_k - e'_k|$ to all the leaf nodes in the subtree rooted at node $j_k$ ($k=1, \ldots, m$). In other words, $$|M[j_c, b-|s|, e] - M[j_c, b-|s|, e']| \leq \epsilon 2^D R \log N| \quad (7)$$

Now, a simple application of the triangle inequality over inequalities (6) and (7) gives $$|M^a[j_c, b-|s|, e] - M[j_c, b-|s|, e']| \leq (i+1) \cdot \epsilon 2^D R \log N$$

which, combined with inequalities (4) and (5) guarantees that $|M^a[(j), b, (e)] - M[(j), b, (e)]| \leq (i+1) \cdot \epsilon 2^D$ R log N. This completes the proof the claim for the case of a single-node list $j=(j)$.

For the case of a multi-node list $j=(j_1, \ldots, j_m)$, where l>1, recall that $$M^a[j, b, e] = \min_{0 \leq b' \leq b} \max\{M^a[(j_1), b', (e_1)], M^a[(j_2, \ldots, j_l), b - b', (e_2, \ldots, e_l)]\},$$

with the exact same relation holding for the optimal error values (using $M[\ ]$ instead of $M^a[\ ]$ above). Thus, once again, applying the inductive hypothesis and the properties of the exemplary error-rounding procedure to the right-hand side of the above expression, gives $|M^a[j,b,e] - M[j,b,e]| \leq (i+1) \cdot \epsilon 2^D$ R log N. Thus, the claim holds for this case as well.

Now, a simple application of the claim with $j=(\text{root})$ gives $|M^a[(\text{root}),B,(0)] - M[(\text{root}),B,(0)]| \leq (1+\log N)\epsilon 2^D R \log N = O(\epsilon 2^D R \log^2 N)$. Thus, simply setting $$\varepsilon' = \frac{\varepsilon}{O(2^D \log^2 N)}$$

gives a worst-case additive deviation of $\epsilon R$ from the optimal maximum absolute error value. The running-time and space complexity of the exemplary approximation scheme for the above value of ϵ' follow immediately from the earlier discussion.

The bounds represent a truly pathological worst-case scenario for the scheme, where all coefficients on a root-to-leaf path are of maximum absolute value R. In real-life applications, most of the energy of a data signal (i.e., array) is typically concentrated in a few large wavelet coefficients, which implies that most coefficient values in the error tree will be (much) smaller than R. Thus, for real-life practical scenarios, the approximation scheme would be much closer to the optimal solution than the worst-case deviation bounds.

Figure 5:
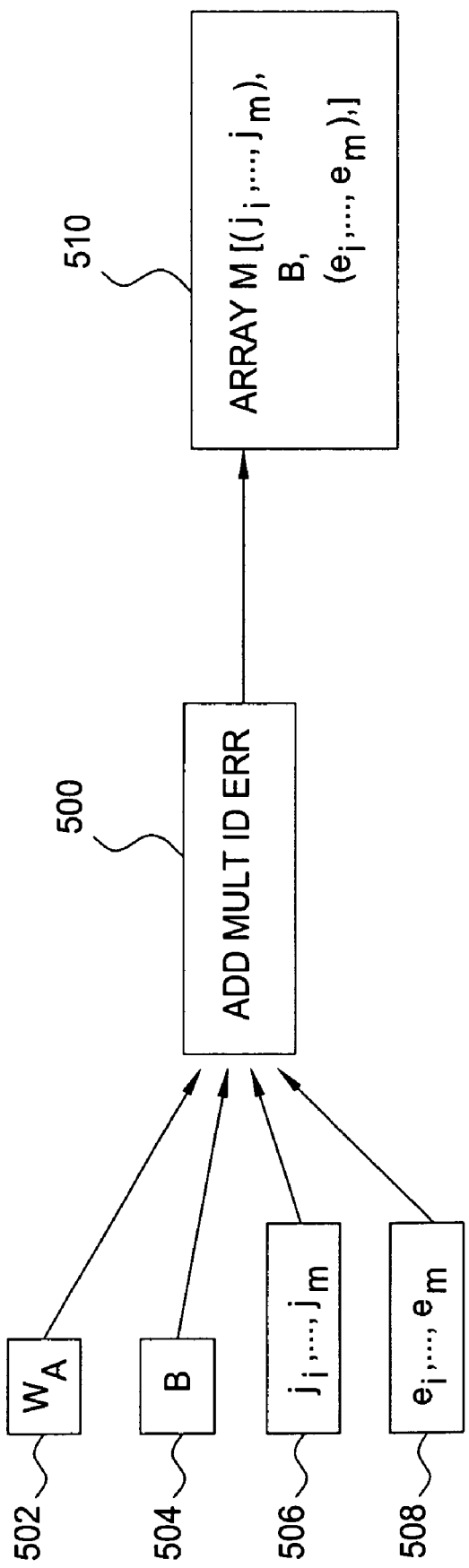
FIG. 5 is a block diagram showing input and output for an exemplary embodiment of an $\epsilon$-additive error approximation scheme for absolute/relative error minimization for deterministic multi-dimensional wavelet thresholding (AddMultIDErr)

FIG. 5 shows input and output for an exemplary embodiment of an ϵ-additive error approximation scheme for absolute/relative error minimization for deterministic multi-dimensional wavelet thresholding (AddMultIDErr) 500. Inputs include the wavelet array ($W_A$) 502, a number of retained coefficients (B) 504, a list of subtree-root indexes ($j_1, \ldots, j_m$) 506, and a list of incoming (rounded) error values ($e_1, \ldots, e_m$) 508. Output includes array $M[(j_1, \ldots, j_m), B, (e_1, \ldots, e_m)]$, which is the approximate minimum maximum relative error for all data values in the subtrees rooted at ($j_1, \ldots, j_m$) for synopsis space B, assuming corresponding incoming error values ($e_1, \ldots, e_m$). The notation includes $round_\epsilon(v)$ which is the round value down to the closest power of $(1+\epsilon)$, i.e., $\pm(1+\epsilon)^k$.

Figure 6A:
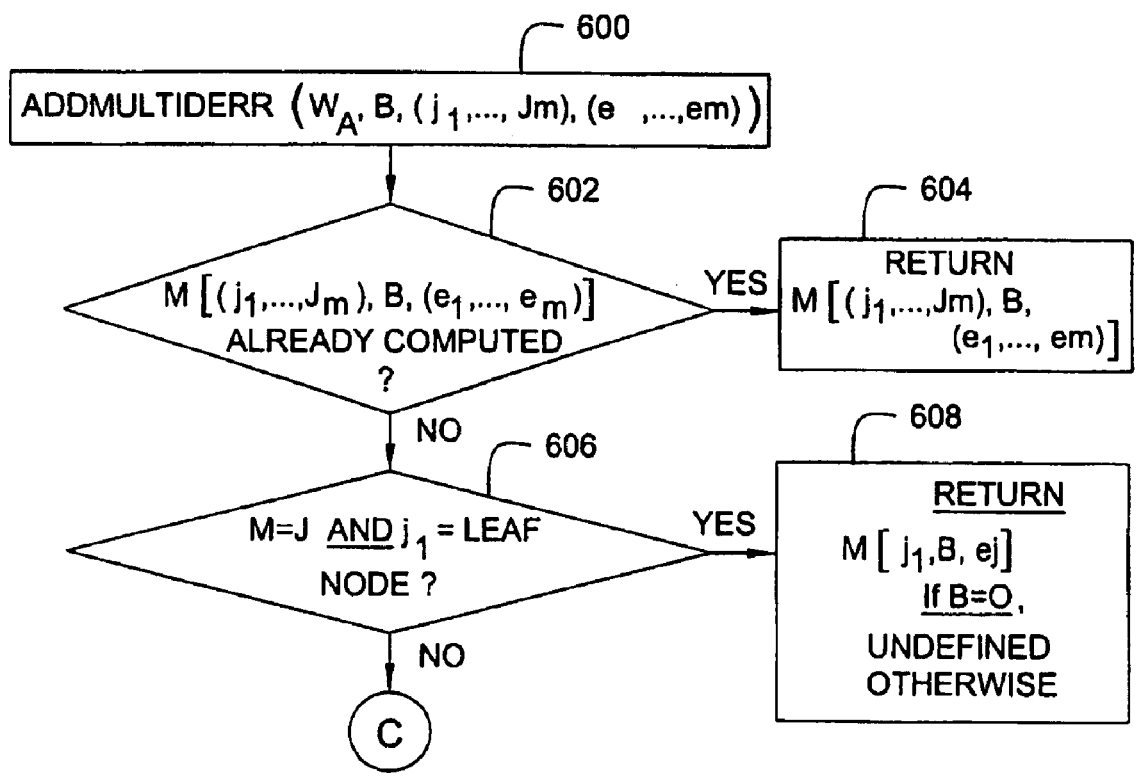
FIGS. 6A and 6B are flowcharts describing the exemplary embodiment of the scheme AddMultIDErr of FIG. 5.
Figure 6B:
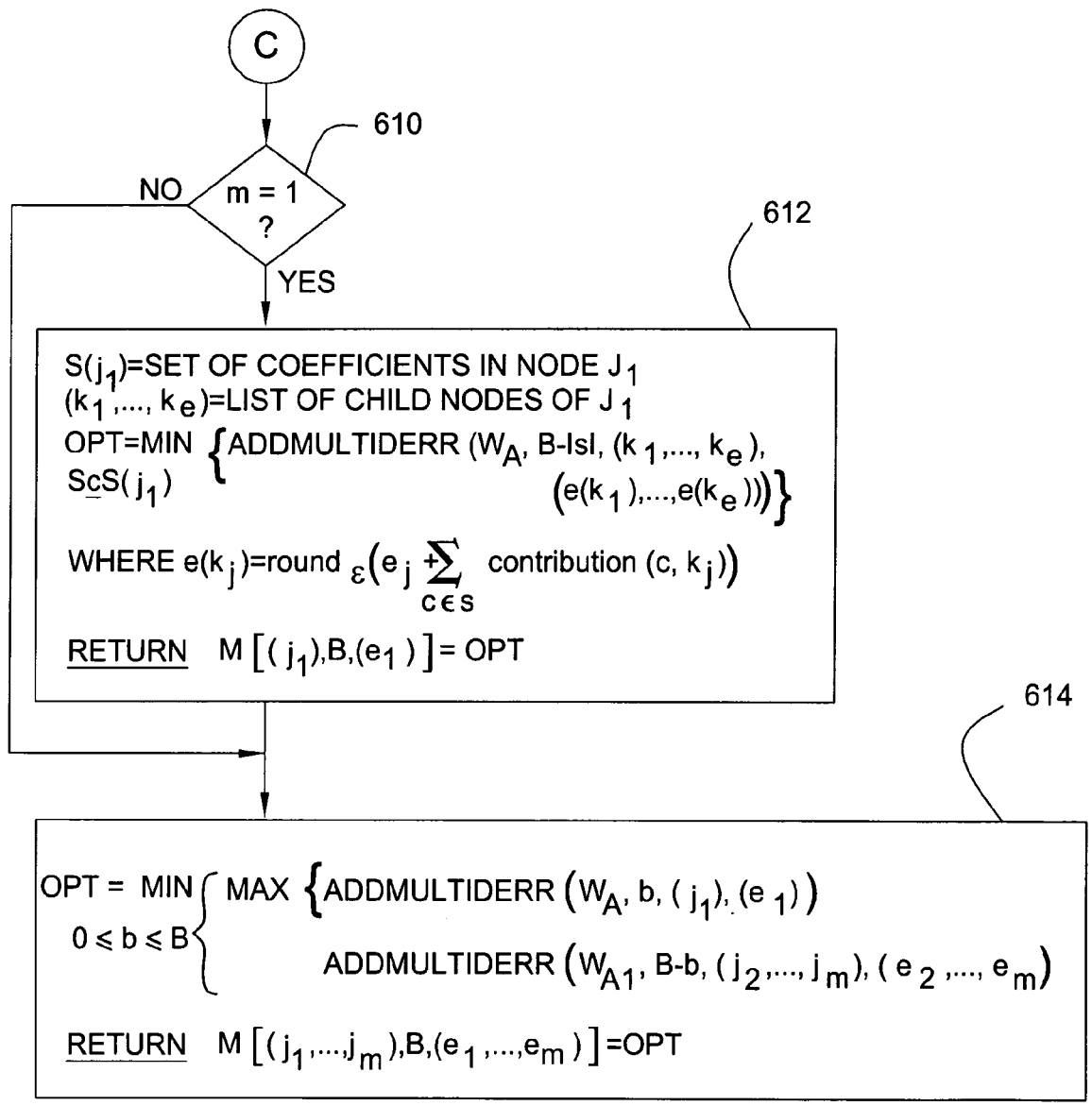

FIGS. 6A and 6B are flowcharts describing the exemplary embodiment of the scheme AddMultIDErr of FIG. 5. In this example, procedure AddMultIDErr starts at 600. It is determined whether array $M[(j_1, \ldots, j_m), B, (e_1, \ldots, e_m)]$ is already computed at 602. If so, then the resulting array is returned at 604; otherwise, it is determined whether m=j and $j_1$ is a leaf node at 606. If so, then the array $M[j_1, B, e_j]$ is computed using a formula if b equals zero, otherwise the array is set to undefined and the array is returned at 608. It is determined whether m=1 at 610. If so, then control flows to 612; otherwise to 614. At 612, computations are performed and array $M[(j_1), B, (e_1)]$=OPT is returned. At 614, other computations are performed and array $M[(j_1, \ldots, j_m), B, (e_1, \ldots, e_m)]$=OPT is returned.

Approximation Scheme for Absolute Error Minimization

For the special case of minimizing absolute error for deterministic multi-dimensional wavelet thresholding, there is an exemplary embodiment of a polynomial-time (1+ϵ)-approximation scheme. Assume that all wavelet coefficients are integers, which can always be satisfied by appropriately scaling the coefficient values. For example, for integer data values $d_i$ (e.g., a multi-dimensional frequency count array), scaling by a factor of $O(2^{D \log N})=O(N^D)$ is always guaranteed to give integer Haar coefficients. Let $R_z$ denote the maximum (scaled) coefficient value in the error tree; as previously; it is easy to see that the additive (integer) contribution to the absolute reconstruction error from any possible path in the Haar error tree is guaranteed to lie in the integer range $R_z=[-E_{max} \log N, +E_{max} \log N]$, where, of course, $E_{max} \leq R_z 2^D$. This observation directly leads to an optimal pseudo-polynomial time algorithm for the maximum absolute-error minimization problem. In fact, this pseudo-polynomial time scheme directly extends to maximum relative-error minimization as well. The coefficients are intelligently scaled-down for the (1+ϵ)-approximation scheme for absolute error so that the possible range of integer additive-error values entering a subtree is polynomially-bounded.

Briefly, the optimal pseudo-polynomial time scheme is again based on dynamic programming over the error tree of integer coefficient values and follows along similar lines as the additive-error approximation algorithm, but without doing any rounding of incoming error values. The algorithm starts by precomputing an error vector E(j,s) for each internal node j in the error tree and each subset s of the coefficient values in S(j). The E(j,s) vector basically stores the total additive error propagated to each of the children of node j if it is decided to drop the coefficients in $s \subseteq S(j)$ from the synopsis; thus, the E(j,s) vector is indexed by the children of node j, and, for the $i^{th}$ child node $j_i$ of j, define the corresponding $i^{th}$ error-vector entry as $$E(j, s) = \sum_{c \in s} \text{sign}(c, j_i) \cdot c$$

where sign(c,$j_i$) is the sign of c's contribution to the $j_i$ child subtree. It is easy to see that computing these error vectors E(j,s) for every j and every $s \subseteq S(j)$ takes $O(N 2^{2^D-1} 2^D)=O(N 2^{2^D+D})$ time. Also, note that the $E_{max}$ boundary in the integer error range $R_z$ can now be defined more precisely as $$E_{max} = \max_{j,s,i} \{E(j, s))[i]\} \leq R_z 2^D.$$

The exemplary pseudo-polynomial DP scheme then constructs a table M[j,b,e] for every node j, space budget b≤B and error value e,e∈$R_z$, where M[j,b,e] denotes the minimum possible maximum absolute error in the $T_j$ subtree, assuming a space budget of b coefficients in $T_j$ and an error contribution of e due to ancestors of node j. As earlier, we define M[j,0,e]= |e| for a leaf/data node j, whereas for an internal node j (with children $j_1, \ldots, j_m$) and assuming that a subset $s \subseteq S(j)$ of coefficients is dropped from the synopsis, compute M[j,b,e] as $$\min_{0 \leq b_1 + \ldots + b_m \leq b - (2^D - 1 - |s|)} \max\{M[j_i, b_i, E(j, s)[i] + e]\}.$$

Thus, the final (optimal) value of M[j,b,e] is computed by dropping the coefficient subset $s \subseteq S(j)$ that minimizes the above term. Once again, the $O(B^{2^D})$ factor needed to cycle through all the $b_1, \ldots, b_m$ allotments can be avoided using the generalization described earlier; thus, there is an optimal DP algorithm that runs in time $O(E_{max} 2^{2^D+D} N \log NB \log B)$. An observation is that if $E_{max}$ is polynomially bounded, then the exemplary DP scheme described above is also a polynomial-time algorithm. This idea is used to devise a polynomial-time (1+ϵ)-approximation scheme.

Given a threshold parameter τ>0, define a truncated DP algorithm as follows. Let $V_{\leq \tau}$ denote the set of error vectors E(j,s) for which the absolute value of each of their entries E(j,s)[i] is at most $\tau_i$; that is, $V_{\leq \tau}=\{E(j,s):|E(j,s)[i]| \leq \tau$ for all i}. Similarly, let $V_{>\tau}$ denote the set of error vectors E(j,s)[i] not in $V_{\leq \tau}$. Finally, define $K_\tau$ as the quantity $$K_\tau = \frac{\varepsilon \tau}{\log N}.$$

The truncated DP algorithm replaces each error vector E(j,s) in the error tree with a scaled-down error vector $$E^\tau(j, s) = \left\lceil \frac{E(j, s)}{K_\tau} \right\rceil$$

(i.e., $$E^\tau(j, s)[i] = \left\lceil \frac{E(j, s)[i]}{K_\tau} \right\rceil$$

for all i) and works with these scaled (integer) error vectors. Furthermore, at any node j, the algorithm only considers dropping subsets $s \subseteq S(j)$ such that $E(j,s) \epsilon V_{\leq \tau}$ from the synopsis. More formally, build a DP array $M^\tau[j,b,e]$ using the scaled error vectors as follows. As previously, for a leaf node j, define $M^\tau[j,b,e]=|e|$. For an internal node j, the algorithm cycles through only those subsets $s \epsilon S(j)$ such that $E(j,s) \epsilon V_{\leq \tau}$. The $M^\tau[j,b,e]$ entry is undefined if $b < 2^D - 1 - |s|$ for all s such that $E(j,s) \epsilon V_\tau$. The DP recurrence for computing $M^\tau[j,b,e]$ is identical to the one for the exemplary pseudo-polynomial scheme described above, except for the fact that $E(j,s)$ is replaced by its scaled version $E^\tau(j,s)$.

It is claimed that the above truncated DP is a polynomial-time algorithm for any value of the threshold parameter $\tau$. Indeed, since at each node j, it is considered dropping coefficient subsets s with error vectors $E(j,s,)$ in $V_{\leq \tau}$, the absolute additive error propagated to each child of j is guaranteed to be at most $$\max_i |E^\tau(j, s)[i]| \leq \frac{\tau}{K_\tau} = \frac{\log N}{\varepsilon}.$$

This, of course, implies that the absolute additive error that can enter any subtree in the exemplary truncated DP algorithm is at most $\log^2 N/\epsilon$; in other words, the range of possible (integer) incoming error values e for the truncated DP array $M^\tau[\ ]$ is guaranteed to be only $$R_Z^\tau = \left[ -\frac{1}{\varepsilon} \log^2 N, +\frac{1}{\varepsilon} \log^2 N \right].$$

Thus, based on the earlier analysis, the running time of the truncated DP algorithm for a fixed parameter $\tau$ is only $O(1/\epsilon 2^{2^D + D} N \log^2 NB \log B)$.

Given a threshold parameter $\tau$, the exemplary truncated DP algorithm selects a subset $C_\tau$ of coefficients to retain in the synopsis. The absolute-error approximation scheme employs the truncated DP algorithm for each value $\tau \epsilon \{2^k : k=0, \ldots, [\log(R_z 2^D)]\}$, and finally selects the synopsis $C_\tau$ that minimizes the maximum absolute error in the data-value reconstruction. Clearly, since we only try $O(D + \log R_z)$ different values for $\tau$, the running time of the approximation algorithm remains polynomial.

The above-described scheme gives a $(1+\epsilon)$-approximation algorithm for maximum absolute error minimization. Consider the optimal maximum error synopsis $C_{OPT}$ and let absErr($C_{OPT}$) denote the corresponding maximum absolute error value. Also, for each internal node j in the error tree, let $s^*_j \subseteq S(j)$ denote the subset of coefficient dropped form the optimal synopsis $C_{OPT}$ at node j. Finally, let C denote the maximum absolute value across all entries in the collection of error vectors $E(j,s^*_j)$ for all j; that is, $C = \max_{j,i} \{E(j, s^*_j)[i]\}$. Clearly, the approximation algorithm is going to try a threshold parameter, say $\tau'$, such that. The goal is to show that the maximum absolute error achieved by $C_{\tau'}$ (i.e., absErr($C_{\tau'}$)) is very close to that achieved by the optimal solution $C_{OPT}$.

First, note that, by the definition of C and $\tau'$, the optimal solution may drop a subset of coefficients $s \subseteq S(j)$ at node j only if $E(j,s) \epsilon V_{\leq \tau'}$. Thus, $C_{OPT}$ is a feasible solution to the truncated DP instance (with threshold=$\tau'$). Now let absErr($C_{\tau'}$), absErr($C_{OPT}$) denote the maximum absolute errors in the $K_{\tau'}$-scaled instance for the $C_{\tau'}$ synopsis (obtained by the truncated DP scheme) and the optimal $C_{OPT}$ synopsis, respectively. Given the optimality of the truncated DP for the scaled instance, $$\text{absErr}_{\tau'}(C_{\tau'}) \leq \text{absErr}_{\tau'}(C_{OPT}) \quad (8)$$

Let C be any wavelet synopsis (i.e., subset of Haar coefficients). In a $K_{\tau'}$-scaled instance, any error-vector value for C is represented by $$E^{\tau'}(j, s)[i] = \left\lceil \frac{E(j, s)[i]}{K_{\tau'}} \right\rceil$$

which differs by at most 1 from $$\frac{E(J, s)[i]}{K_{\tau'}};$$

thus, it is easy to see that the scaled and non-scaled maximum absolute errors for the C synopsis are related as follows $$\text{absErr}(C) \epsilon (K_{\tau'} \text{absErr}_{\tau'}(C) \pm K_{\tau'} \log N). \quad (9)$$

Applying the above formula for $C = C_{OPT}$ and combining with equation (8), $$\text{absErr}(C_{OPT}) \geq K_{\tau'} \text{absErr}_{\tau'}(C_{OPT}) - K_{\tau'} \log N$$

$$\geq K_{\tau'} \text{absErr}_{\tau'}(C_{\tau'}) - K_{\tau'} \log N,$$

and using equation (9) once again with $C = C_{OPT}$, $$\text{absErr}(C_{\tau'}) \leq K_{\tau'} \text{absErr}_{\tau'}(C_{\tau'}) + K_{\tau'} \log N$$

Now, simply combining the last two formulas and substituting $$K_{\tau'} = \frac{\varepsilon \tau'}{\log N},$$

$$\text{absErr}(C_{\tau'}) \leq \text{absErr}(C_{OPT}) + 2K_{\tau'} \log N \leq \text{absErr}(C_{OPT}) + 2\epsilon \tau'. \quad (10)$$

The goal now is to demonstrate that absErr($C_{OPT}$) is at least $\Omega(\tau')$. The proof relies on the following ancillary claim. Claim: Let C be any Haar-coefficient synopsis and, for any internal node j, let $e_j^C$ denote the absolute value of the additive error coming into the $T_j$ subtree due to ancestors of node j dropped from the C synopsis. Then, absErr($C$) $\geq e_j^C$.

Proof: Making use of the following observation, let T denote the (multidimensional) Haar error tree (FIG. 2) where all coefficient values are retained (to allow for exact data reconstruction). Given an internal node j, let $v(T_j)$ denote the total additive contribution from ancestors of node j during the data-reconstruction process fro the data values at the leaves of the $T_j$ subtree (rooted at j). Clearly, this additive contribution $v(T_j)$ is the same for all leaves of $T_j$, and, letting path(j) denote the set of all proper ancestor nodes of j in T, $v(T_j)$ is simply computed as $$v(T_j) = \sum_{c_i \in path(j)} sign_{i,j} \cdot c_i$$

where $sign_{i,j}$ is either +1 or −1 depending on how the $c_i$ coefficient affects the data values in the $T_j$ subtree. One of the basic properties of the Haar-wavelet decomposition is that $v(T_j)$ is exactly the average of all the data values at the leaf nodes of the $T_j$ subtree. This is quite intuitive, as the Haar-wavelet coefficients are essentially trying to summarize the data at successively coarser levels of resolution.

Now, let $T^C$ denote the error tree where only the coefficients in C are retained (with all other coefficients set to 0). Note that, by the definition of $e_j^C$, $e_j^C = |v(T_j) - v(T_j^C)|$. Also, let j1, ..., $j_m$ be the children of node j in T and $T^C$. The observation above directly implies that $v(T_j)$ is the average of the child-subtree values $v(T_{j_i})$, i.e., $$v(T_j) = \frac{1}{m} \sum_{i=1}^{m} v(T_{j_i})$$

(and, of course, the same also holds for the corresponding approximate values $v(T_j^C)$ and $v(T_{j_1}^C), \ldots v(T_{j_m}^C)$). Consider the absolute incoming additive errors $e_{j_i}^C$ at child nodes $j_i$ of j. The discussion earlier implies the following inequality:

$$e_j^C = |v(T_j) - v(T_j^C)| = \frac{1}{m}\left|\sum_{i=1}^{m} v(T_{j_i}) - \sum_{i=1}^{m} v(T_{j_i}^C)\right| \leq \frac{1}{m}\sum_{i=1}^{m} e_{j_i}^C.$$

Thus, there must exist at least one child node, say $j_k$, of j such that $e_{j_k}^C \geq e_j^C$. Continuing this argument, a path is obtained from node j to a leaf/data value dl in the $T_j^C$ subtree such that the absolute additive error entering that leaf, i.e., $|\tilde{d}_l - d_l|$, is at least $e_j^C$. But, then, absErr(C) $\geq |\tilde{d}_l - d_l| \geq e_j^C$. This completes the proof for the claim.

Lemma: Let $C_{OPT}$ be the optimal maximum absolute error synopsis and let τ' be as defined above. Then, $$absErr(C_{OPT}) > \frac{\tau}{4}.$$

Proof: By the definition of τ', there exists an error-tree node j such that the subset of dropped coefficients $s^*_j \subseteq S(j)$ for j in the optimal solution $C_{OPT}$ satisfies $$|E(j, s_j^*)[k]| \geq \frac{\tau'}{2}$$

for some child $j_k$ of j. Now consider two possible cases for $e_j^{C_{OPT}}$, the absolute additive error entering the subtree rooted at node j in the optimal solution: (1) If $$e_j^{C_{OPT}} \geq \frac{\tau'}{4},$$

then, by the above claims, $$absErr(C_{OPT}) \geq \frac{\tau'}{4}.$$

(2) If $$e_j^{C_{OPT}} < \frac{\tau'}{4},$$

then the absolute value of the additive error entering the subtree rooted at child $j_k$ of j is at least $$\frac{\tau'}{2} - \frac{\tau'}{4} = \frac{\tau'}{4};$$

thus, the claims again imply that $$absErr(C_{OPT}) \geq \frac{\tau'}{4}.$$

This completes the proof.

Combining inequality (10) with the lemma, $$absErr(C_{\tau'}) \leq (1+8\epsilon)absErr(C_{OPT}).$$

Thus, simply setting $\epsilon' = \epsilon/8$, there is a $(1+\epsilon)$-approximation scheme for maximum absolute error minimization in multiple dimensions.

In summary, there is an exemplary approximation scheme for deterministic multi-dimensional wavelet thresholding that discovers an approximate solution that is guaranteed to be within $(1+\epsilon)$ of the optimal (i.e., minimum) maximum absolute error in time $$O\left(\frac{\log R_Z}{2^\epsilon} 2^{2^D + D} N \log^2 N B \log B\right)$$

and with a total space requirement of $$O\left(\frac{1}{\epsilon} 2^D N \log^2 NB\right).$$

Extension to General Error Metrics

Exemplary embodiments described above include the minimization of maximum-error metrics (like, maximum relative error) in the approximate data-value reconstruction.

However, exemplary embodiments of the present invention have much more general applicability. Once again, this is in sharp contrast with prior art thresholding schemes that can handle only maximum-error metrics. Consider the natural class of distributive error metrics defined formally below.

Distributive Error Metrics

Consider an approximation of a (one- or multi-dimensional) data array A, and let f(R) denote the error in the data-value approximation over the (one- or multi-dimensional) range of values R in A. We say that the error metric f( ) is distributive if and only if, for any collection of disjoint ranges $R_1 \ldots, R_k$, there exists some combining function g( ) such that the error over the entire region $\cup_{i=1}^{k} R_i$ can be defined as $$f(\cup_{i=1}^{k} R_i) = g(f(R_1), \ldots, f(R_k))$$

The above-defined class of distributive error metrics encompasses several important approximation-error functions. For instance, the maximum-error metrics defined above are clearly distributive (with the combining function g( ) being simply the max { } of its input arguments). Furthermore, it is not hard to see that most important cumulative approximation-error metrics are also naturally distributive, including the mean relative error $$\frac{1}{N} \sum_i w_i \cdot relErr_i$$

and the $$L_{p-norm} \text{error} \left[ \frac{1}{N} \sum_i |d_i - \hat{d}_i|^p \right]^{\frac{1}{p}}$$

for any $p \geq 0$ in the data reconstruction, as well as the weighted variants of these metrics $$\left( \frac{1}{N} \sum_i w_i \cdot relErr_i \text{ and } \left[ \frac{1}{N} \sum_i w_i \cdot |\hat{d}_i - d_i|^p \right]^{\frac{1}{p}}, \text{respectively} \right),$$

respectively), where different weights $w_i$ (typically normalized, such that $$\sum_i w_i = 1)$$

are associated with the errors for different values in the underlying data domain. Such weights are an important tool for capturing the importance of individual data values, for example, based on the non-uniformities of the observed query workload.)

An observation is that the exemplary optimal DP formulation can, in fact, be easily adapted to work with any distributive error metric. Given such an error metric f( ), the basic idea is to define the DP array M[j,b,S] as well as the DP recurrences for computing its entries using the general form of the f( )-metric and the corresponding combining function g( ) that allows us to "distribute" the computation of f( ) over subranges of the data domain I. More specifically, define the base case for the exemplary DP recurrence (i.e., for leaf nodes $c_j=d_{j-N}$, $j \geq N$) as $M[j,0,S]=f(\{d_{j-N}\}|S)$ for each subset $S \subseteq \text{path}(d_j-N)$, where $f(\{d_{j-N}\}|S)$ denotes the value of the f( ) error metric at data value $d_{j-N}$ assuming the coefficients in S are kept in the synopsis. Now, in the case of an internal note $c_j$ with j<N, define the optimal error M[j,b,S] when coefficient $c_j$ is either dropped from or kept in the synopsis in a manner similar to equations (2)-(3) with the difference that max { } is now replaced by the combining function g( ) for the distributive error metric f( ). More formally, the general DP recurrence for f( ) simply defines M[j,b,S]=min {$M_{drop}$[j,b,S], $M_{keep}$[j,b,S]}, where $$M_{drop}[j, b, S] = \min_{0 \leq b' \leq b} g \begin{pmatrix} M[2j, b', S], \\ M[2j+1, b-b', S] \end{pmatrix},$$

and $$M_{keep}[j, b, S] = \min_{0 \leq b' \leq b-1} g \begin{pmatrix} M[2j, b', S \cup \{c_j\}], \\ M[2j+1, b-b'-1, S \cup \{c_j\}] \end{pmatrix}.$$

For example, as a more concrete problem setting, consider the adaptation of our optimal DP formulation for the case of the mean weighted relative error metric $$\frac{1}{N} \sum_i w_i \cdot relErr_i.$$

Since the averaging factor N is basically constant (i.e., the size of the data domain), it is obviously sufficient to optimize the cumulative weighted relative error; that is, we seek to minimize $$f(\{d_1, \ldots, d_N\}) = \sum_i w_i \cdot relErr_i = \sum_i \frac{w_i \cdot |d_i - \hat{d}_i|}{\max\{|d_i|, s\}},$$

(for a given sanity bound value s).

For the base case of data (i.e., leaf) nodes $c_j=d_j-N$ with $j \geq N$, we define M[j,0,S] (for each subset $S \subseteq \text{path}(d_{j-N})$) as the weighted relative error at value $d_{j-N}$ (assuming the coefficients in S are retained in the synopsis); that is, $$M[j, 0, S] = f\left(\{d_{j-N}\} | S\right) = \frac{w_{j-N} \cdot \left| d_{j-N} - \sum_{c_k \in S} sign_{j-N,k} \cdot c_k \right|}{\max\{|d_{j-N}|, s\}}$$

For the case of internal nodes $c_j$ with j<N, note that the combining function g( ) for our cumulative weighted relative error metric is simple summation; thus, we define M[j,b,S] =min {$M_{drop}$[j,b,S], $M_{keep}$[j,b,S]}, where $$M_{drop}[j, b, S] = \min_{0 \leq b' \leq b} \left\{ \begin{array}{l} M[2j, b', S] + \\ M[2j+1, b-b', S] \end{array} \right\},$$

-continued and $$M_{keep}[j, b, S] = \min_{0 \le b'b - 1} \left\{ \begin{array}{l} M[2j, b', S \cup \{c_j\}] + \\ M[2j+1, b-b'-1, S \cup \{c_j\}] \end{array} \right\}.$$

Since the exemplary optimal DP formulation extends directly to multi-dimensional data arrays and wavelets, the above-described generalizations are directly applicable to multiple dimensions as well; that is, of course, modulo the super-exponential explosion in space/time complexity with increasing dimensionality. Furthermore, note that both the exemplary efficient approximation schemes for near-optimal thresholding in multiple dimensions are essentially based on sparser versions of this optimal multi-dimensional dynamic program. Thus, the exemplary maximum-error approximation algorithms can also be adapted to work with other distributive error metrics as well with similar approximation guarantees; for instance, the techniques and analyses above can easily be extended to (approximately) optimize for the corresponding cumulative error metrics (i.e., mean absolute and mean relative error).

Figure 7:
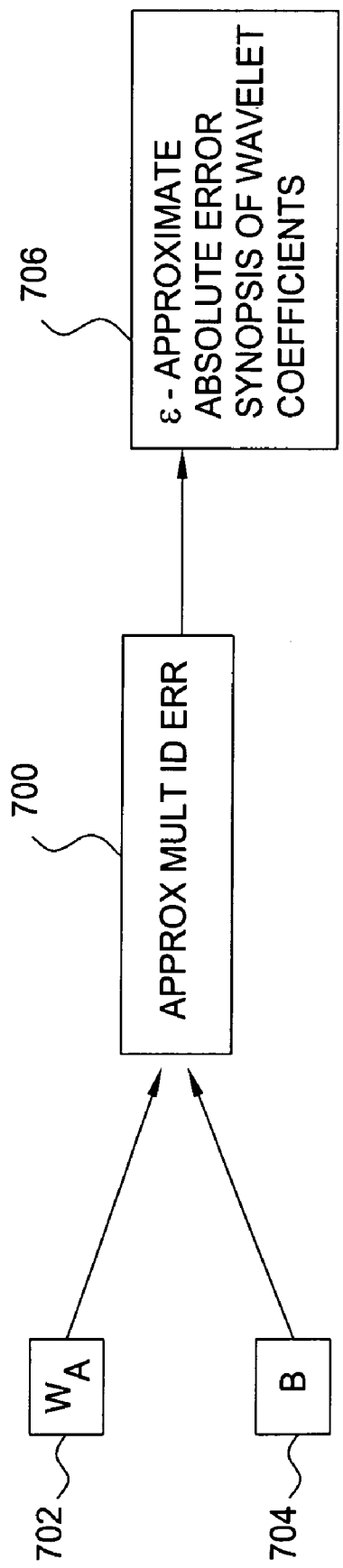
FIG. 7 is a block diagram showing input and output for an exemplary embodiment of a (1+$\epsilon$) approximation scheme for absolute error minimization for deterministic multi-dimensional wavelet thresholding (ApproxMultIDErr)

FIG. 7 shows input and output for an exemplary embodiment of a (1+ϵ) approximation scheme for absolute error minimization for deterministic multi-dimensional wavelet thresholding (ApproxMultIDErr) 700. Inputs to ApproxMultIDErr 700 include a wavelet array ($W_A$) 702 and a number of retained coefficients (B) 704. Outputs include the ϵ-approximate absolute error synopsis of wavelet coefficients 706. Some notation includes $R_z$=maximum absolute coefficient value, N=maximum dimension size, and S(j)=set of coefficients at node j.

Figure 8A:
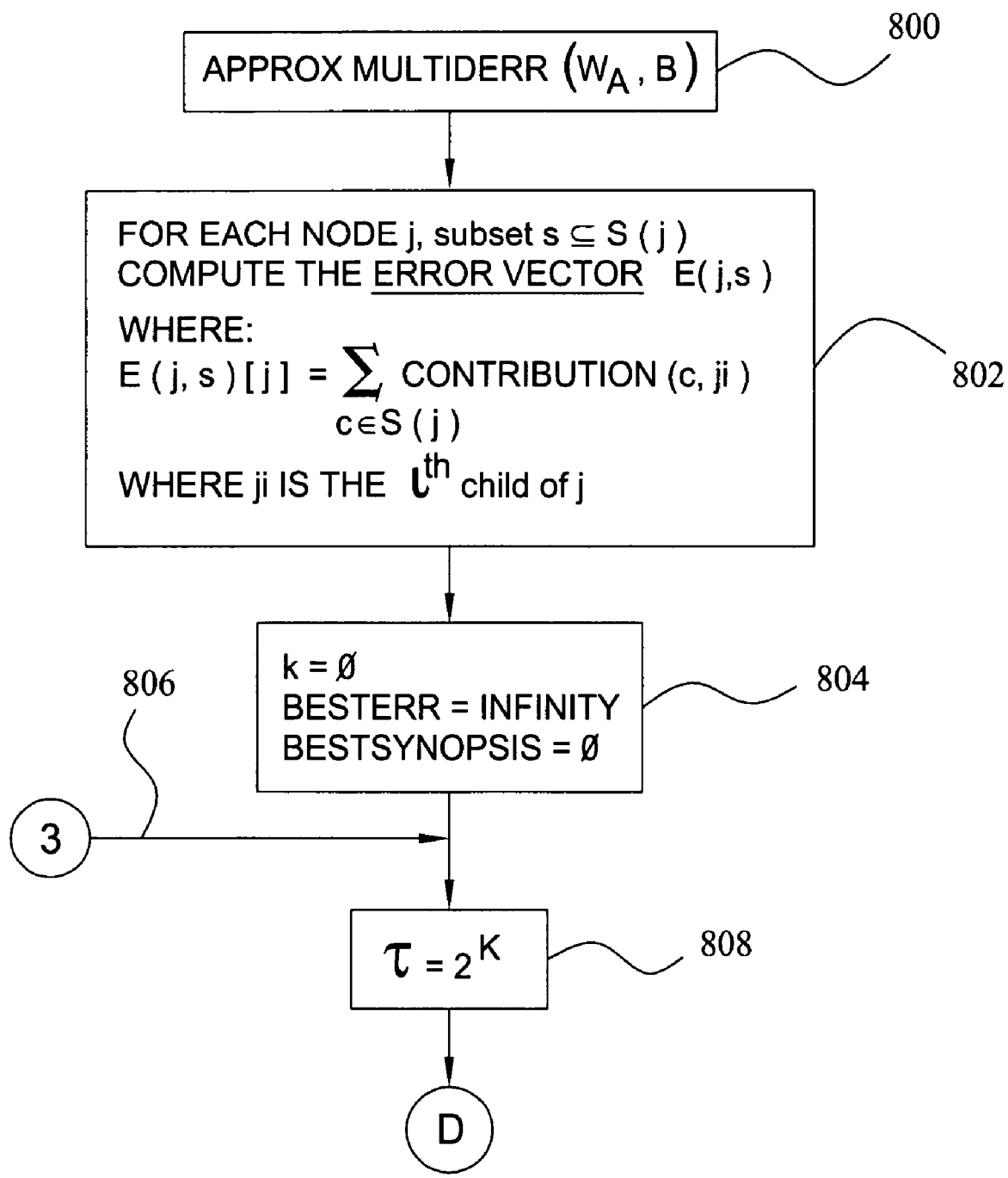
FIGS. 8A, 8B, and 8C are flowcharts describing the exemplary embodiment of the scheme ApproxMultIDErr of FIG. 7.
Figure 8B:
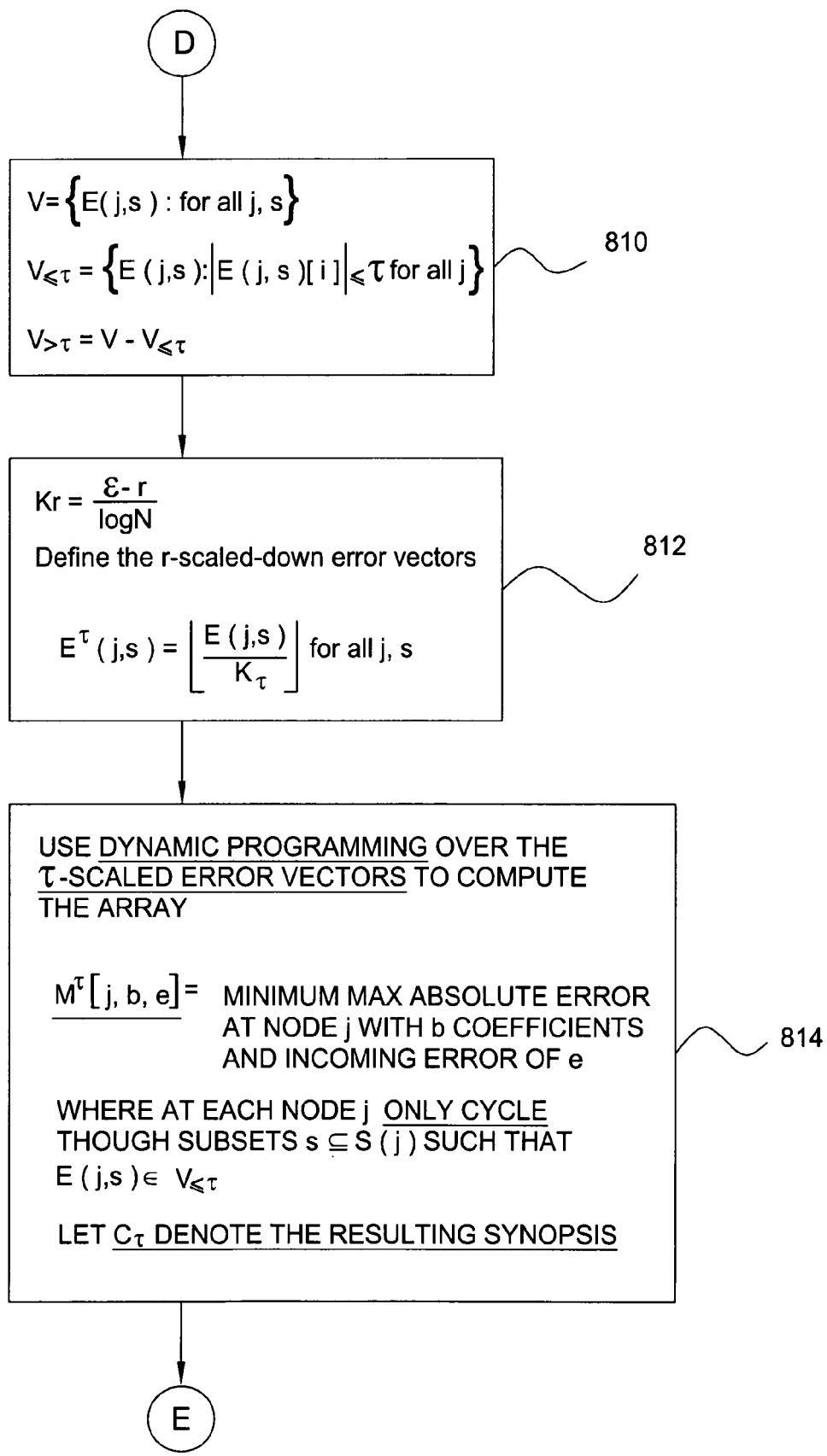
Figure 8C:
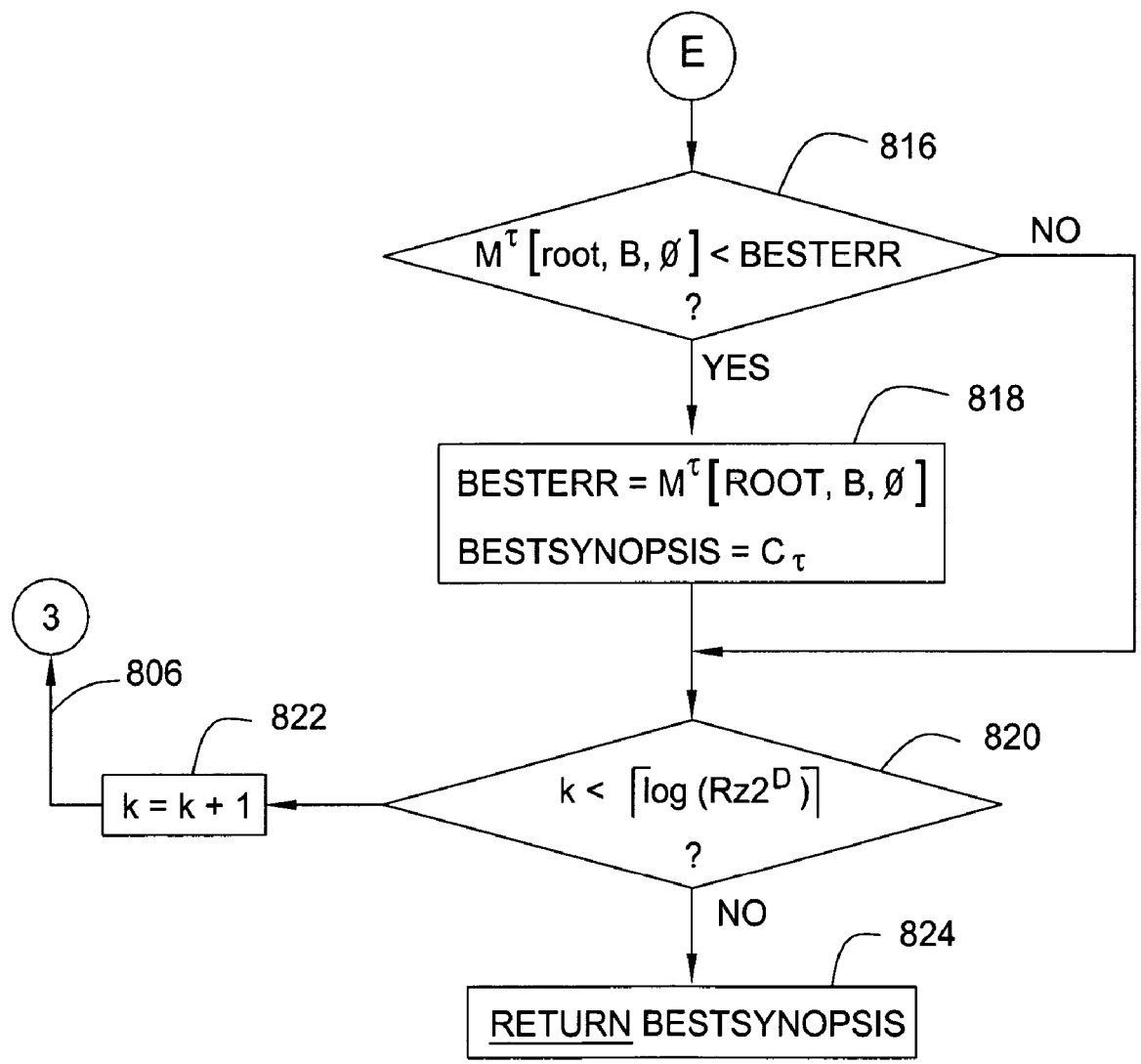

FIGS. 8A-8C are flowcharts describing the exemplary embodiment of the scheme ApproxMultIDErr of FIG. 7. In this example, procedure ApproxMultIDErr starts at 800. An error vector is computed for each node at 802. Initializations are performed at 804 and the top of a loop starts at 806, 808, where $\tau=2^k$. Then, V, $V_{\le \tau}$, and $V_{>\tau}=V-V_{\le \tau}$ are computed at 810. Next, $K_r$ is computed and the r-scaled-down error vectors $E^r(j,s)$ are defined at 812. Using dynamic programming over the r-scaled down error vectors, the array $M^r[j,b,e]$ is computed, which is the minimum maximum absolute error at node j with b coefficients and incoming error of e and the resulting synopsis is defined at 814. It is determined whether $M^r[root,B,0]$ is less than the best error at 816. If so, the best error is set to $M^r[root,B,0]$ and the best synopsis is set to $C_\tau$; otherwise, the end of the loop test is performed at 820. If it is not the end of the loop, the loop index is incremented at 822 and control flow back via branch 806 to 808; otherwise, the best synopsis is returned at 824.

Wavelets have a long history of successes in the signal and image processing arena and, recently, they have also found their way into data-management applications. Haar-wavelet coefficients have been used as synopses for accurately estimating the selectivities of range queries. I/O-efficient algorithms for building multi-dimensional Haar wavelets from large relational data sets and showing that a small set of wavelet coefficients can efficiently provide accurate approximate answers to range aggregates over OLAP cubes. Haar wavelets are used as a general-purpose approximate query processing tool by designing efficient algorithms that can process complex relational queries (with joins, selections, etc.) entirely in the wavelet-coefficient domain. The problem of on-line maintenance for coefficient synopses can be solved with a probabilistic-counting technique that approximately maintains the largest normalized-value coefficients in the presence of updates. Algorithms exist for building approximate one-dimensional Haar-wavelet synopses over numeric data streams. There are time- and space-efficient techniques for constructing Haar-wavelet synopses for data sets with multiple measure (such as those typically found in OLAP applications).

All of the above applications rely on conventional $L_2$-error-based thresholding schemes that typically decide the significance of a coefficient based on this absolute normalized value. Such conventional wavelet synopses can suffer from several problems, including the introduction of severe bias in the data reconstruction and wide variance in the quality of the data approximation, as well as a lack of non-trivial guarantees for individual approximate answers. In contrast, their proposed probabilistic wavelet synopses rely on a probabilistic thresholding process based on randomized rounding that tries to probabilistically control the maximum relative error in the synopsis by minimizing appropriate probabilistic metrics, like normalized standard error or normalized bias. The problem addressed by the present invention, namely the design of efficient deterministic thresholding schemes for maximum error metrics, has not been addressed by the prior art.

There is a rich mathematical literature on m-term approximations using wavelets, where m is the number of coefficients in the synopsis. Some prior work has studied thresholding approaches for meeting a target upper bound for an $L_p$-error metric. However, the prior art does not address the deterministic minimization of relative errors with sanity bounds, which is an important scenario for approximate query processing in databases and the present invention provides computationally-efficient (optimal and near-optimal) deterministic thresholding schemes for minimizing maximum-error metrics for one- and multi-dimensional wavelet summaries.

Embodiments of the present invention include novel, computationally-efficient schemes for deterministic maximum-error wavelet thresholding in one and multiple dimensions. For one-dimensional wavelets, an optimal, low polynomial-time thresholding algorithm based on a new dynamic-programming formulation minimizes either the maximum relative error or the maximum absolute error in the data approximation. For the multi-dimensional case, embodiments include novel, polynomial-time approximation schemes with tunable ϵ-approximation guarantees for the target metric for maximum-error thresholding based on approximate dynamic programs.

Figure 9:
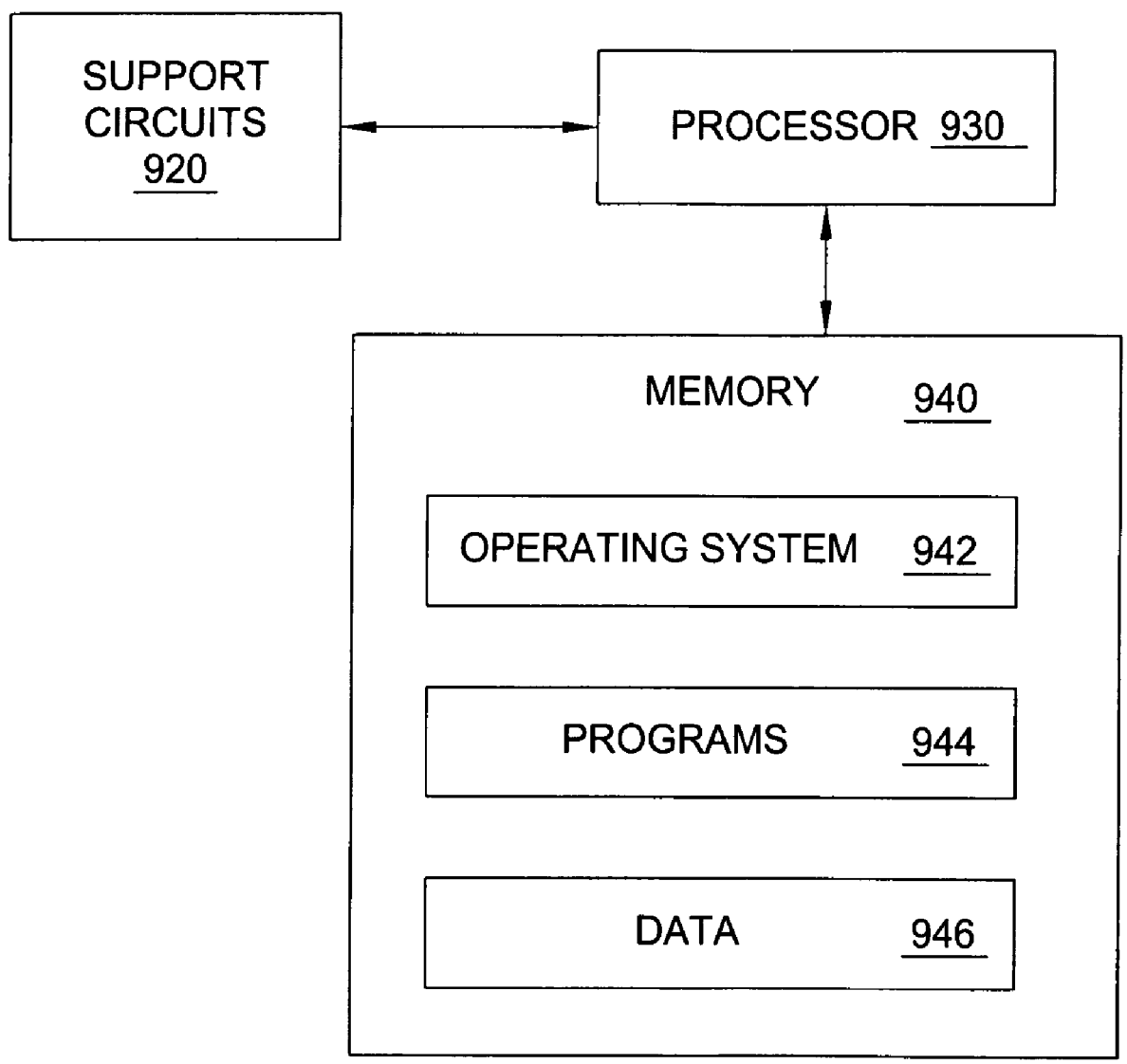
FIG. 9 is a high level block diagram showing a computer.

FIG. 9 is a high level block diagram showing a computer. The computer 900 may be employed to implement embodiments of the present invention. The computer 900 comprises a processor 930 as well as memory 940 for storing various programs 944 and data 946. The memory 940 may also store an operating system 942 supporting the programs 944.

The processor 930 cooperates with conventional support circuitry such as power supplies, clock circuits, cache memory and the like as well as circuits that assist in executing the software routines stored in the memory 940. As such, it is contemplated that some of the steps discussed herein as software methods may be implemented within hardware, for example, as circuitry that cooperates with the processor 930 to perform various method steps. The computer 900 also contains input/output (I/O) circuitry that forms an interface between the various functional elements communicating with the computer 900.

Although the computer 900 is depicted as a general purpose computer that is programmed to perform various functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for deterministic wavelet thresholding for optimizing general-error metrics, comprising using a processor to perform the steps of:
   building a deterministic wavelet synopsis that minimizes maximum error in a data-value approximation; and
   providing a minimum maximum error for all data values in an error subtree of an error tree associated with the deterministic wavelet synopsis, wherein a minimum maximum error value for the error subtree is conditioned on a root node of the error subtree, an amount of storage allotted for the deterministic wavelet synopsis, and an error that enters the error subtree through coefficient selections made on a path from a root node of the error tree toward the root node of the error subtree.

2. The method of claim 1, wherein the minimum maximum error is a maximum relative error.

3. The method of claim 1, wherein the minimum maximum error is a maximum absolute error.

4. The method of claim 1, wherein the deterministic wavelet synopsis is built over a one-dimensional data array.

5. The method of claim 1, wherein the deterministic wavelet synopsis is built over a multi-dimensional data array.

6. A method for deterministic wavelet thresholding for optimizing general-error metrics, comprising using a processor to perform the steps of:
   building a deterministic wavelet synopsis that minimizes maximum error in a data-value approximation, wherein the deterministic wavelet synopsis comprises a plurality of coefficients, wherein each coefficient of the deterministic wavelet synopsis is retained deterministically; and
   providing a minimum maximum error for all data values in a subtree for the deterministic wavelet synopsis.

* * * * *